United States Patent
Zhang et al.

(10) Patent No.: US 11,025,172 B2
(45) Date of Patent: Jun. 1, 2021

(54) THREE-LEVEL MODULATION FOR WIDE OUTPUT VOLTAGE RANGE ISOLATED DC/DC CONVERTERS

(71) Applicant: DELTA ELECTRONICS, INC., Neihu (TW)

(72) Inventors: Chi Zhang, Apex, NC (US); Peter Barbosa, Durham, NC (US); Yang Jiao, Cary, NC (US)

(73) Assignee: DELTA ELECTRONICS, INC., Neihu (TW)

( * ) Notice: Subject to any disclaimer, the term of this patent is extended or adjusted under 35 U.S.C. 154(b) by 0 days.

(21) Appl. No.: 16/882,679

(22) Filed: May 25, 2020

(65) Prior Publication Data

US 2021/0067045 A1 Mar. 4, 2021

Related U.S. Application Data

(63) Continuation-in-part of application No. 16/551,543, filed on Aug. 26, 2019, now abandoned.

(51) Int. Cl.
*H02M 3/335* (2006.01)
*H02M 1/08* (2006.01)

(52) U.S. Cl.
CPC ....... *H02M 3/33569* (2013.01); *H02M 1/083* (2013.01)

(58) Field of Classification Search
CPC ............. H02M 3/33569; H02M 1/083; H02M 3/33538; H02M 3/33546; H02M 3/33592; H02M 3/33576; H02M 3/33515
See application file for complete search history.

(56) References Cited

U.S. PATENT DOCUMENTS 9,263,960 B2 2/2016 Jovanovic et al.
9,973,099 B2 5/2018 Ye et al.
(Continued)

FOREIGN PATENT DOCUMENTS

CN 102611310 A 7/2012
WO 2019052880 A1 3/2019

OTHER PUBLICATIONS

Barbi, Ivo, et al., "DC-DC converter: four switches Vpk=Vin/2, capacitive turn-off snubbing, ZV turn-on", IEEE Transactions on Power Electronics, vol. 19, No. 4, Jul. 2004, pp. 918-927.
(Continued)

*Primary Examiner* — Thienvu V Tran
*Assistant Examiner* — Bart Iliya
(74) *Attorney, Agent, or Firm* — Edward C. Kwok; VLP Law Group, LLP

(57) ABSTRACT

A three-level modulation for an isolated multilevel DC/DC resonant converter offers output voltage regulation capability with fixed switching frequency and achieves high efficiency along with soft-switching of the power switches. The three-level modulation enables current balance in all power devices, therefore, realizes better thermal performance and longer circuit life. An efficient control method that combines the three-level modulation with conventional frequency modulation achieves a wide output voltage range with a narrow switching frequency range. At any given time, a control circuit selects one of two different modulation schemes to operate the primary-side switches of the resonant converter based on an output voltage, or to one or more external control signals. Together with a selected device switching frequency and duty cycles, the two modulation schemes generate different voltage waveforms to a primary-side transformer, which are coupled to the secondary-side to provide different output voltages.

29 Claims, 38 Drawing Sheets

(56) References Cited

U.S. PATENT DOCUMENTS

| | | | |
|---|---|---|---|
| 10,224,827 | B1 | 3/2019 | Zhu et al. |
| 10,298,070 | B2 | 5/2019 | Sakata |
| 10,298,138 | B2 | 5/2019 | Jia et al. |
| 2006/0133119 | A1* | 6/2006 | Nomura ............ H02M 3/33592 363/25 |
| 2009/0316443 | A1 | 12/2009 | Coccia et al. |
| 2015/0229225 | A1 | 8/2015 | Jang et al. |
| 2019/0386572 | A1* | 12/2019 | Itoh ......................... H02M 1/40 |
| 2020/0266719 | A1* | 8/2020 | Oh ........................... H02M 7/06 |

OTHER PUBLICATIONS

Beiranvand, Reza, et al., "A Design Procedure for Optimizing the LLC Resonant Converter as a Wide Output Range Voltage Source", IEEE Transaction on Power Electronics, vol. 27, No. 8, Aug. 2012, pp. 3749-3763.

Coccia, A., et al., "Wide input voltage range compensation in DC/DC resonant architectures for on-board traction power supplies", 2007 European Conference on Power Electronics and Applications, 2007, 10 pages.

Deng, Junjun, et al., "Design Methodology of LLC Resonant Converters for Electric Vehicle Battery Chargers", IEEE Transaction on Vehicular Technology, vol. 63, No. 4, May 2014, pp. 1581-1592.

Fang, Zhijian, et al., "Optimal Design Methodology for LLC Resonant Converter in Battery Charging Applications Based on Time-Weighted Average Efficiency", IEEE Transaction on Power Electronics, vol. 30, No. 10, Oct. 2015, pp. 5469-5483.

Gu, Yilei, et al., "Three-level LLC series resonant DC/DC converter", IEEE Transactions on Power Electronics, vol. 20, No. 4, Jul. 2005, pp. 781-789.

Guo, Zhiqiang, et al., "Hybrid Three-Level and Half-Bridge DC-DC Converter With Reduced Circulating Loss and Output Filter Inductance", IEEE Transactions on Power Electronics, vol. 30, No. 12,, Dec. 2015, pp. 6628-6638.

Inam, Wardah , et al., "Variable Frequency Multiplier Technique for High-Efficiency Conversion Over a Wide Operating Range", IEEE Journal of Emerging and Selected Topics in Power Electronics, vol. 4, No. 2, Jun. 2016, pp. 335-343.

Jiao, Yang, et al., "Topology Evaluation and Comparison for Isolated Multilevel D,C/DC Converter for Power Cell in Solid State Transformer", IEEE, 978-I-5386-8330-9, 2019, pp. 802-809.

Li, Zhenwei, et al., "Research on Dual-Operation Mode of 3-level LLC resonant converter", 2015 9th International Conference on Power Electronics and ECCE Asia (ICPE-ECCE Asia) Seoul, Korea, Jun. 2015, pp. 2636-2643.

Lin, Bor-Ren, et al., "New Three-Level PWM DC/DC Converter—Analysis, Design and Experiments", Journal of Power Electronics, vol. 14, No. 1, Jan. 2014, pp. 30-39.

Liu, Dong, et al., "Periodically Swapping Modulation (PSM) Strategy for Three-Level (TL) DC/DC Converters With Balanced Switch Currents", IEEE Transactions on Industrial Electronics, vol. 65, No. 1, Jan. 2018, pp. 412-423.

Muntahina, Umme , et al., "Multimode Optimization of the Phase-Shifted LLC Series Resonant Converter", IEEE Transaction on Power Electronics, vol. 33, No. 12, Dec. 2018, pp. 10478-10489.

Musavi, Fariborz, et al., "An LLC Resonant DE-DE Converter for Wide Output Voltage Range Battery Charging Applications", IEEE Transaction on Power Electronics, vol. 28, No. 12, Dec. 2013, pp. 5437-5445.

Pinheiro, J. Renes, et al., "The three-level ZVS PWM converter—a new concept in high voltage DC-to-DC conversion", Proceedings of the 1992 International Conference on Industrial Electronics, Control, Instrumentation, and Automation, San Diego, CA, USA,, 1992, pp. 173-178.

Saravanan, S., et al., "Analysis of a Three-Level LLC Series Resonant Converter for High- and Wide-Input-Voltage Applications", Int. Journal of Engineering Research and Applications, vol. 4, Issue 4( Version 5), Apr. 2014, pp. 79-84.

Zong, Sheng, et al., "Asymmetrical Duty Cycle-Controlled LLC Resonant Converter With Equivalent Switching Frequency Doubler", IEEE Transactions on Power Electronics, vol. 31, No. 7, 2016, pp. 4963-4973.

Jin, Feng, et al., "Multi-Phase Multi-Level LLC Resonant Converter with Low Voltage Stress on the Primary-Side Switches", IEEE Energy Conversion Congress and Exposition (ECCE), XP032680638, DOI: 10.1109/ECCE.2014.6954045, Sep. 14, 2014, pp. 4704-4710.

"Extended Search Report, European Patent Application 20192603.7", dated Dec. 18, 2020, 11 pages.

Chen, Wei, et al., "A Novel 200~800Vdc Ultra-wide Range Input Dc-Dc Converter with Optimum Intelligent Polymorphic Topologies", Applied Power Electronics Conference and Exposition, 2009. Apec 2009. Twenty-Fourth Annual IEEE, Piscataway, NJ, USA, Feb. 15, 2009, 7 pages.

Liu, Fuxin, et al., "Modified Three-Phase Three-Level DC/DC Converter With Zero-Voltage-Switching Characteristic-Adopting Asymmetrical Duty Cycle Control", IEEE Transactions on Power Electronics, Institute Of Electrical And Electronics Engineers, vol. 29, No. 12, Dec. 1, 2014, pp. 6307-6318.

\* cited by examiner

[T4 - T5]

$[T_{15} - T_{16}]$

THREE-LEVEL MODULATION FOR WIDE OUTPUT VOLTAGE RANGE ISOLATED DC/DC CONVERTERS

CROSS REFERENCE TO RELATED APPLICATIONS

The present application is a continuation-in-part of U.S. patent application ("Parent Application"), Ser. No. 16/551,543, entitled "Isolated DC/DC Converters For Wide Output Voltage Range And Control Methods Thereof," filed on Aug. 26, 2019. The disclosure of the Parent Application is hereby incorporated by reference in its entirety.

BACKGROUND OF THE INVENTION

1. Field of the Invention

This invention relates to modulation methods for power converters, such as isolated DC/DC converters. More specifically, this invention relates to a modulation method for a resonant DC/DC converter to attain regulation of an output voltage over a wide voltage range.

2. Discussion of the Related Art

The LLC resonant converter topology has been widely used as an isolated DC/DC converter, due to its high efficiency, simple structure achieved by magnetic integration, soft switching on both primary and secondary switches, and capability suitable for applications with wide voltage ranges. FIGS. 1(a) and 1(b) show, respectively, an exemplary conventional full-bridge LLC resonant converter under closed-loop voltage control, and its timing diagrams for switch control signals $S_1$ to $S_4$ and primary-side full-bridge output voltage $V_{AB}$. Output voltage $V_{AB}$ may be regulated by controlling the switching frequency of these primary-side switches. Highest efficiency is attained when the LLC resonant converter operates at the resonant frequency ($f_r$)—determined by resonant inductor $L_r$ and resonant capacitor $C_r$—and when the DC voltage gain M[1] equals the transformer's turns ratio $$\frac{N_P}{N_S}.$$

DC

[1] $M = \frac{V_{out}}{V_{in}}$ voltage gain M diminishes when the switching frequency ($f_{sw}$) is greater than resonant frequency $f_r$. Conversely, gain M becomes greater when switching frequency $f_{sw}$ is less than resonant frequency $f_r$. Efficiency, however, always diminishes as switching frequency $f_{sw}$ moves away from resonant frequency $f_r$. To achieve desired output voltage range, the LLC resonant converter operates at a corresponding frequency range.

For wide output voltage range applications, such as battery charging applications, the LLC circuit parameters must carefully trade-off between efficiency and the output voltage range. In the prior art, many techniques for achieving a wide output voltage range have been developed, such as those disclosed in:

(a) "Design Methodology of LLC Resonant Converters for Electric Vehicle Battery Chargers," by J. Deng et al., published in the *IEEE Transactions on Vehicular Technology*, vol. 63, no. 4, pp. 1581-1592, May 2014;

(b) "An LLC Resonant DC-DC Converter for Wide Output Voltage Range Battery Charging Applications," by F. Musavi et al., published in *IEEE Transactions on Power Electronics*, vol. 28, no. 12, pp. 5437-5445, December 2013;

(c) "A Design Procedure for Optimizing the LLC Resonant Converter as a Wide Output Range Voltage Source," by R. Beiranvand et al., published in the *IEEE Transactions on Power Electronics*, vol. 27, no. 8, pp. 3749-3763, August 2012; and (d) "Optimal Design Methodology for LLC Resonant Converter in Battery Charging Applications Based on Time-Weighted Average Efficiency," by Z. Fang et al., published in the *IEEE Transactions on Power Electronics*, vol. 30, no. 10, pp. 5469-5483, October 2015.

Nevertheless, these techniques can only optimize converter circuits to achieve a limited output voltage range with compromised efficiency.

To achieve a wider output voltage range with good efficiency, modifications of circuit structures and control schemes have been proposed for a conventional LLC resonant converter. For example, the article "Multimode Optimization of the Phase-Shifted LLC Series Resonant Converter" ("Mumtahina") by U. Mumtahina and P. J. Wolfs, published in *IEEE Transactions on Power Electronics*, vol. 33, no. 12, pp. 10478-10489, December 2018, discloses an LLC resonant converter that combines conventional frequency control and phase-shift control schemes to achieve a wide output range. FIGS. 2(a) and 2(b) show, respectively, Mumtahina's full-bridge LLC resonant converter with closed-loop voltage control, and its timing diagrams under phase-shift control for switch control signals $S_1$ to $S_4$ and primary-side full-bridge output voltage $V_{AB}$. Mumtahina teaches providing a phase shift between the two pairs of gate signals at the two legs of the primary side switches. Using both phase-shift control and switching frequency control, Mumtahina's LLC resonant converter operates at a lower switching frequency in a voltage step-down operation.

U.S. Pat. No. 9,263,960 B2 ("Jovanovic") to M. Jovanovic and B. Irving, entitled "Power Converters for Wide Input or Output Voltage Range and Control Methods Thereof," granted on Feb. 16, 2016, discloses a topology-morphing control method for a full-bridge LLC circuit that operates under either a full-bridge or a half-bridge topology. FIGS. 3(a) and 3(b) show, respectively, Jovanovic's full-bridge LLC resonant converter under topology-morphing control, and its timing diagrams for switch control signals $S_1$ to $S_4$ and full-bridge output voltage $V_{AB}$ during a full-bridge to half-bridge topology transition. In Jovanovic, the circuit topology adapts to the control signals, which in return respond to the input or output operating conditions.

U.S. Patent Application Publication 2015/0229225A1 ("Jang") by Y. Jang and M. Jovanovic, entitled "Resonant Converter and Control Methods Thereof," filed on Aug. 13, 2015, discloses a control scheme for a series resonant converter (SRC) that combines a variable-frequency control scheme with a delay-time control scheme. FIG. 4 is a circuit diagram for Jang's SRC. In Jang, a variable frequency control scheme is applied to the primary-side switches, while a delay-time control scheme is applied to the secondary-side switches. The result is a boost to the output voltage, thus achieving a wider output voltage range, under control of a narrower switching frequency range.

To achieve a wide output voltage range, the input voltage to the LLC resonant converter must be high enough to avoid an undesirably high DC gain. In this regard, a three-level topology—in which each switching device blocks only one-half of the input voltage—is a more attractive alternative than the conventional full-bridge topology of FIG. 1(a). A three-level topology is disclosed, for example, in the article. "The three-level ZVS PWM converter—a new concept in high voltage DC-to-DC conversion" ("Pinheiro"), by J. R. Pinheiro and I. Barbi, published in the *Proceedings of the* 1992 *International Conference on Industrial Electronics, Control, Instrumentation, and Automation*, San Diego, Calif., USA, 1992, pp. 173-178 vol. 1. The three-level topology is described for LLC converters in the article "Three-level LLC series resonant DC/DC converter" ("Gu"), by Y. Gu, et al., published in *IEEE Transactions on Power Electronics*, vol. 20, no. 4, pp. 781-789, July 2005. Gu's LLC converters achieve zero-voltage switching (ZVS) for the switches without additional auxiliary circuit.

A three-level serial half bridge (SHB) topology, also known as stacked buck topology, is disclosed in the article, "DC-DC converter: four switches $V_{pk}=V_{in}/2$, capacitive turn-off snubbing, ZV turn-on" ("Barbi"), by I. Barbi, et al. in *IEEE Transactions on Power Electronics*, vol. 19, no. 4, pp. 918-927, July 2004. Barbi removes the two clamping diodes in the conventional three-level topology of Pinheiro.

A half-input voltage, two-level modulation scheme for a DC/DC converter is disclosed in the article, "Asymmetrical Duty Cycle-Controlled LLC Resonant Converter With Equivalent Switching Frequency Doubler" ("Zong"), by S. Zong, et al., published in *IEEE Transactions on Power Electronics*, vol. 31, no. 7, pp. 4963-4973, 7 2016. Zong halves the switching frequency of the primary switches to reduce the driving loss.

For applications with wide input voltage ranges, both full input voltage, two-level modulation and half input voltage, two-level modulation schemes are applied to SHB LLC converters in the articles, (a) "Wide input voltage range compensation in DC/DC resonant architectures for on-board traction power supplies," by A. Coccia, et al., published in 2007 *European Conference on Power Electronics and Applications*, 2007; (b) "Variable Frequency Multiplier Technique for High-Efficiency Conversion Over a Wide Operating Range," by W. Inam, et al., published in *IEEE Journal of Emerging and Selected Topics in Power Electronics*, vol. 4, no. 2, pp. 335-343, June 2016; and (c) "Research on Dual-Operation Mode of 3-level LLC resonant converter," by A. Z. Li, et al., published in 2015 *9th International Conference on Power Electronics and ECCE Asia (ICPE-ECCE Asia)*, 2015. FIGS. 5(a) and 5(b) show, respectively, the circuit diagram and timing diagrams for the gate signals, demonstrating the two-level modulation schemes may also be effective approaches to regulate the output voltage.

To achieve a wide output voltage range, the three-level modulation approach reduces the voltage gain once the maximum operating frequency has been reached. Under a three-level modulation scheme, however, the currents through the primary power switches are not balanced, which can cause thermal imbalance on the devices, shorten the device life and even lead to device damage. To balance the currents in the power switches, a periodically swapping modulation strategy is disclosed in the article, "Periodically Swapping Modulation (PSM) Strategy for Three-Level (TL) DC/DC Converters With Balanced Switch Currents" ("Liu"), by D. Liu, et al., published in *IEEE Transactions on Industrial Electronics*, vol. 65, no. 1, pp. 412-423, January 2018. FIGS. 6(a) and 6(b) show, respectively, the circuit diagram and timing diagrams for the gate signals in Liu's DC/DC converters. However, Liu's gate signals of each half-bridge are not complementary, which increases the complexity of the gate driving circuit. In addition, the body diode of the MOSFETs conducts current due to the non-optimized gate signals, which increases conduction loss and reduces system efficiency.

SUMMARY

The present invention provides a three-level modulation scheme for a resonant DC/DC converter that regulates the output voltage by controlling a duty cycle of the voltage levels. Such a three-level modulation enables further reduction of the output voltage after the maximum operating frequency has been reached, which is advantageous in wide input or output voltage range applications. Moreover, the three-level modulation scheme of the present invention can achieve a current balance in all power devices, thereby realizing better thermal performance and a longer circuit life.

According to one embodiment of the present invention, a power converter having first and second input terminals to receive an input signal from a voltage source to provide an output voltage or an output current to at least one load, includes: (a) a transformer having primary and secondary windings, (b) a primary-side circuit coupled to the primary winding of the transformer, (c) a secondary-side circuit coupled to the secondary winding of the transformer, and (d) a control circuit. The primary-side circuit includes (i) first, second, third, and fourth series-connected switching devices connected across the first and second input terminals, the first and second switching devices being controlled by first and second switch control signals, respectively, and the third and the fourth switching devices being controlled by a third and a fourth complementary switch control signals, respectively; and (ii) a resonant tank circuit, the resonant circuit being coupled (1) between a first electrical node, being a common electrical node between the first and second switching devices, and a second electrical node, being a common electrical node between the third and fourth switching devices; and (2) to the primary winding of the transformer. The secondary-side circuit includes a filter capacitor providing the output voltage or output current to the load.

Based on the output voltage or the output current, the control circuit is configurable to generate the first, second, third, and fourth switch control signals according to a first modulation scheme in which (i) the first and the second switch control signals are substantially complementary with each other and the third and the fourth switch control signals are substantially complementary with each other, (ii) the first, second, third, and fourth switch control signals are periodic with a common switching period, (iii) within the common switching period, (1) each switch control signal has two rising edges and two falling edges; and either (2) the first rising edge of the first switch control signal lags the first rising edge of the fourth switch control signal by a first predetermined time, while the second rising edge of the first switch control signal leads the second rising edge for the fourth switch control signal by a second predetermined time, or (3) the first rising edge of the first switch control signal leads the first rising edge of the fourth switch control signal by a first predetermined time, while the second rising edge of the first switch control signal lags the second rising edge for the fourth switch control signal by a second predetermined time. Under this modulation scheme, the control circuit varies the switching period, the first predetermined time, and the second predetermined time.

Accordingly, the present invention provides a highly efficient modulation scheme that enables a SHB LLC resonant converter to regulate an output voltage using a fixed switching frequency. The modulation scheme generates three different voltage levels which are applied to the resonant tank. By adjusting the duty cycles of the power switches, the duty cycles of the voltage levels are modified. During operation, the duty cycles of the power switches may be selected in response to one or more control signals provided from a controller or in an external command, for example, under a closed-loop control of a regulated output voltage. Based on the selected duty cycles, the controller generates the control signals that drive the primary-side switches of the SHB LLC resonant converter. The modulation scheme achieves current balance in all power switches at any operation point, which realizes better thermal performance and a longer circuit life. In addition, the optimized complementary gate signals enable high efficiency by minimizing conduction losses in the power switches.

In one embodiment of the present invention, to achieve a regulated voltage in a normal output-voltage range, the SHB LLC resonant converter operates under a conventional symmetrical two-level modulation scheme, with its switching frequency being adjusted under closed-loop control. To achieve a regulated voltage in an extra low output-voltage range, the SHB LLC resonant converter operates under a three-level modulation scheme of the present invention at the maximum allowable switching frequency, with its duty cycle being adjusted under closed-loop control. Thus, the SHB LLC resonant converter operates under a narrower switching frequency range with improved efficiency, while still achieving a very wide output-voltage range under different load conditions. In addition, the methods of the present invention have lesser restrictions on certain circuit parameters (e.g., the $L_m$-to-$L_r$ ratio) while achieving desired minimum and maximum DC voltage gains. The methods of the present invention are applicable to converters with different secondary-side topologies and secondary-side control schemes. The methods of the present invention operate under both fixed input-voltage and variable input-voltage conditions.

The present invention is better understood upon consideration of the following detailed description and accompanying figures.

BRIEF DESCRIPTION OF THE DRAWINGS

FIG. 8 indicates signal transitions at times $t_1$, $t_2$, $t_3$, $t_4$, $t_5$, $t_6$, $t_7$, $t_8$, $t_9$, $t_{10}$, $t_{11}$, $t_{12}$, $t_{13}$, $t_{14}$, $t_{15}$, and $t_{16}$.

FIGS. 9a, 9b, 9c, 9d, 9e, 9f, 9g, 9h, 9i, 9j, 9k, 9l, 9m, 9n, 9o and 9p show sixteen operation stages of SHB LLC resonant converter 700 under the 3-level modulation scheme of the present invention, corresponding to time periods ($t_0$, $t_1$), ($t_1$, $t_2$), ($t_2$, $t_3$), ($t_3$, $t_4$), ($t_4$, $t_5$), ($t_5$, $t_6$), ($t_6$, $t_7$), ($t_7$, $t_8$), ($t_8$, $t_9$), ($t_9$, $t_{10}$), ($t_{10}$, $t_{11}$), ($t_{11}$, $t_{12}$), ($t_{12}$, $t_{13}$), ($t_{13}$, $t_{14}$), ($t_{14}$, $t_{15}$), and ($t_{15}$, $t_{16}$), respectively.

DETAILED DESCRIPTION OF THE PREFERRED EMBODIMENTS

1. Circuit Description

To avoid the higher cost associated with a higher input voltage, a multi-level topology may be used to maintain the same device voltage rating for the primary-side bridge. FIG.

Figure 1A:
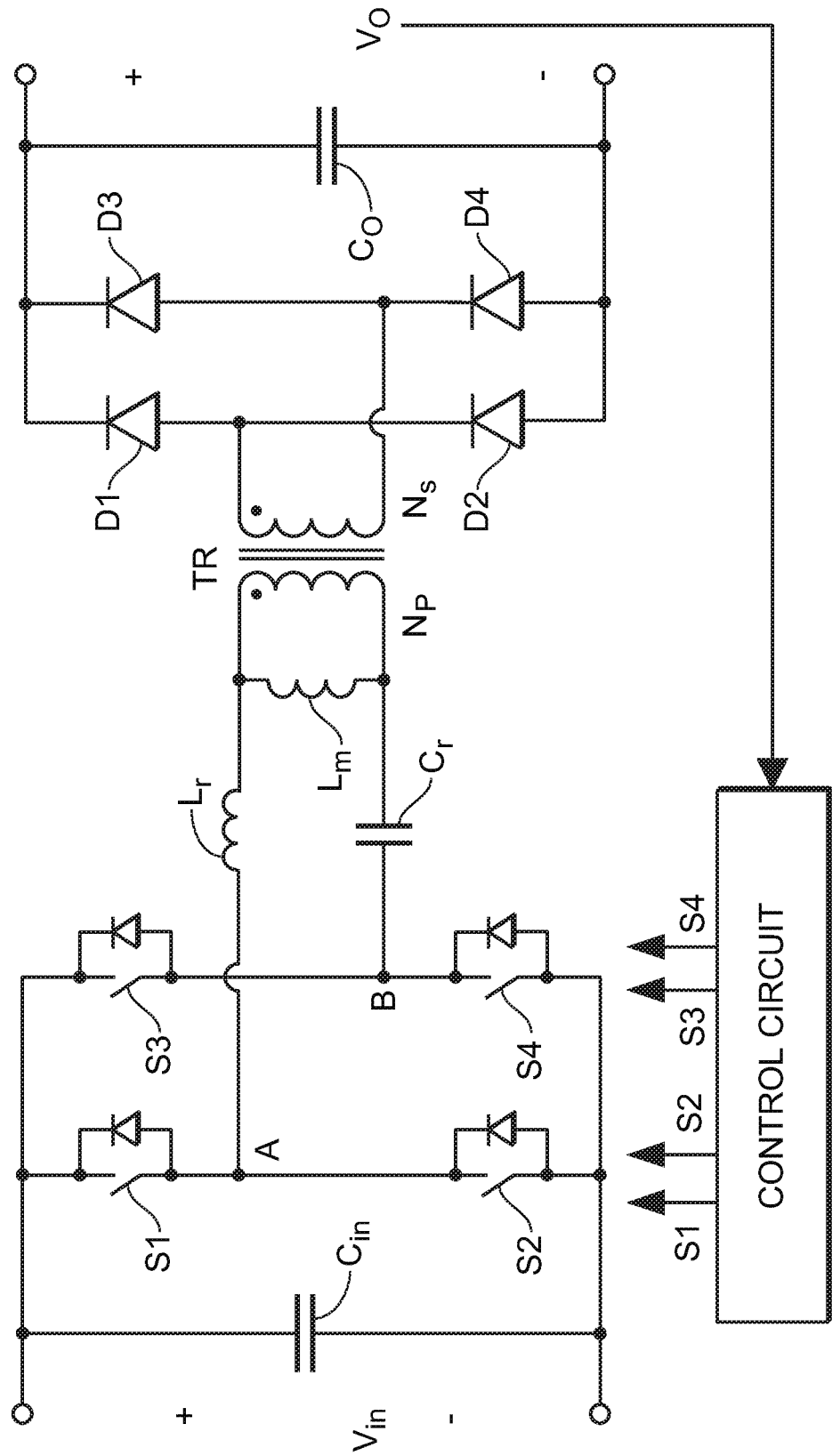
FIGS. 1(a) and 1(b) show, respectively, an exemplary conventional full-bridge LLC resonant converter with closed-loop voltage control, and its timing diagrams under pulse frequency control for switch control signals $S_1$ to $S_4$ and primary-side full-bridge output voltage $V_{AB}$.
Figure 1B:
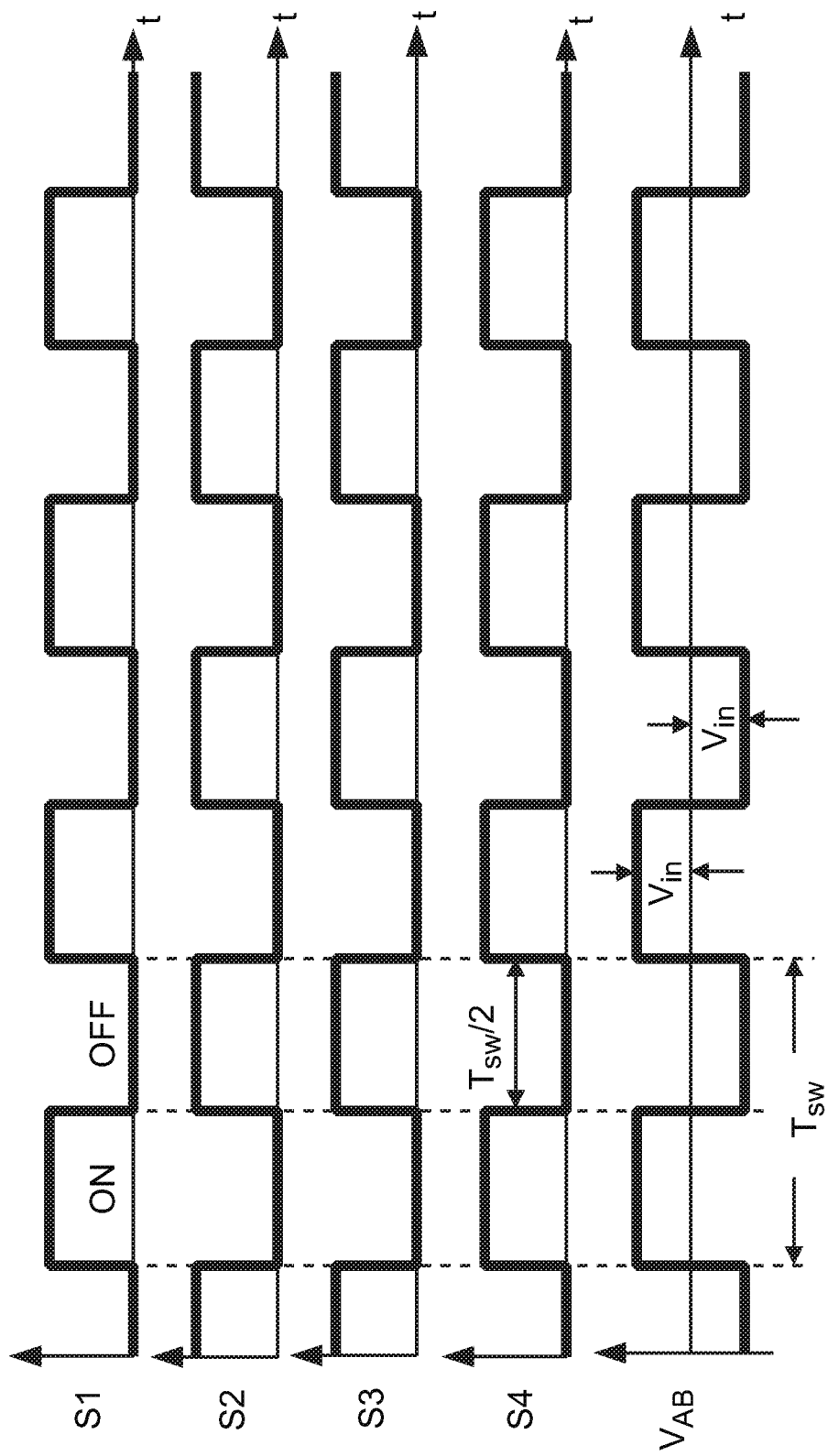
Figure 2A:
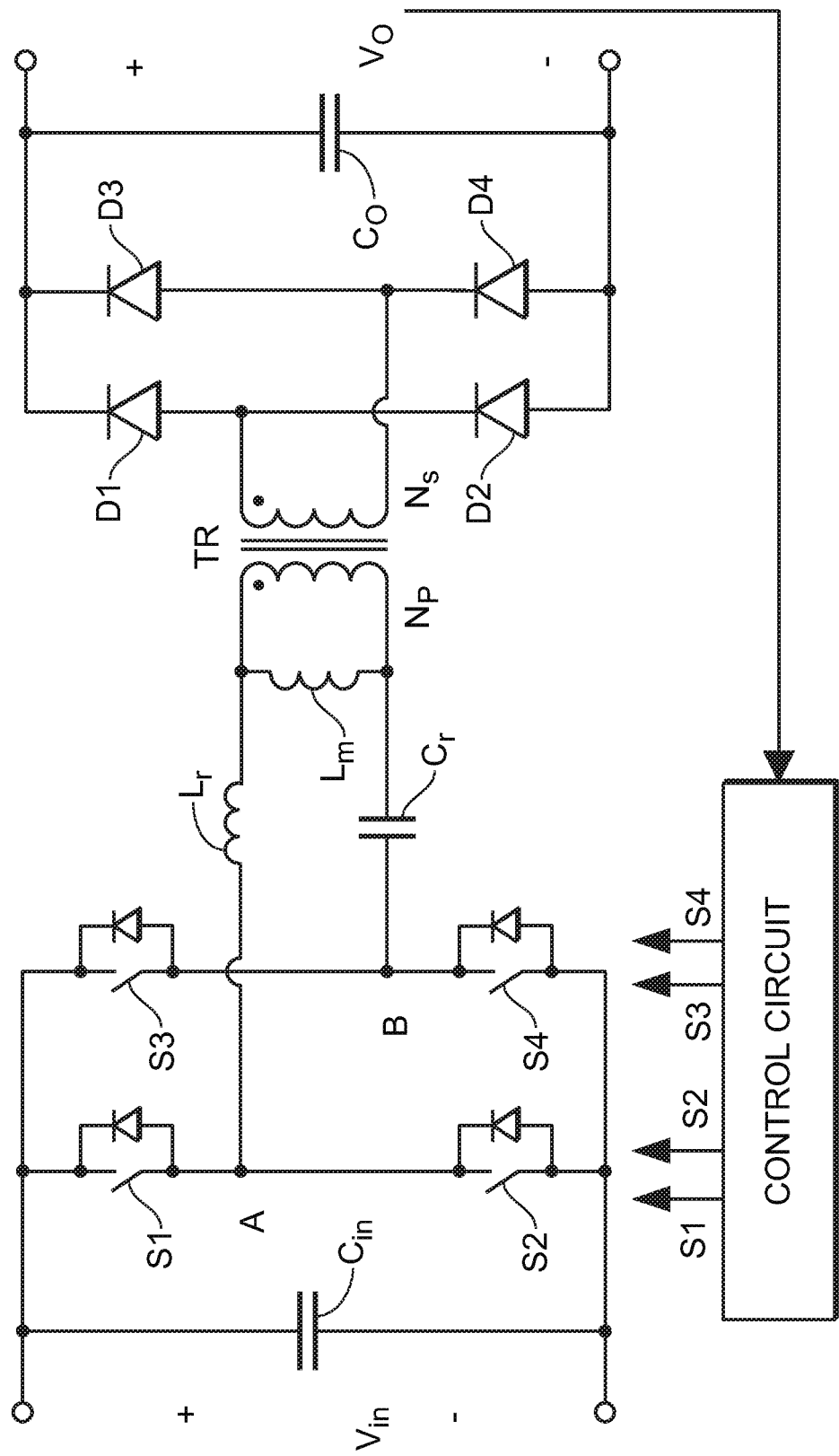
FIGS. 2(a) and 2(b) show, respectively, an exemplary conventional full-bridge LLC resonant converter with closed-loop voltage control, and its timing diagrams under phase-shift control for switch control signals $S_1$ to $S_4$ and primary-side full-bridge output voltage $V_{AB}$.
Figure 2B:
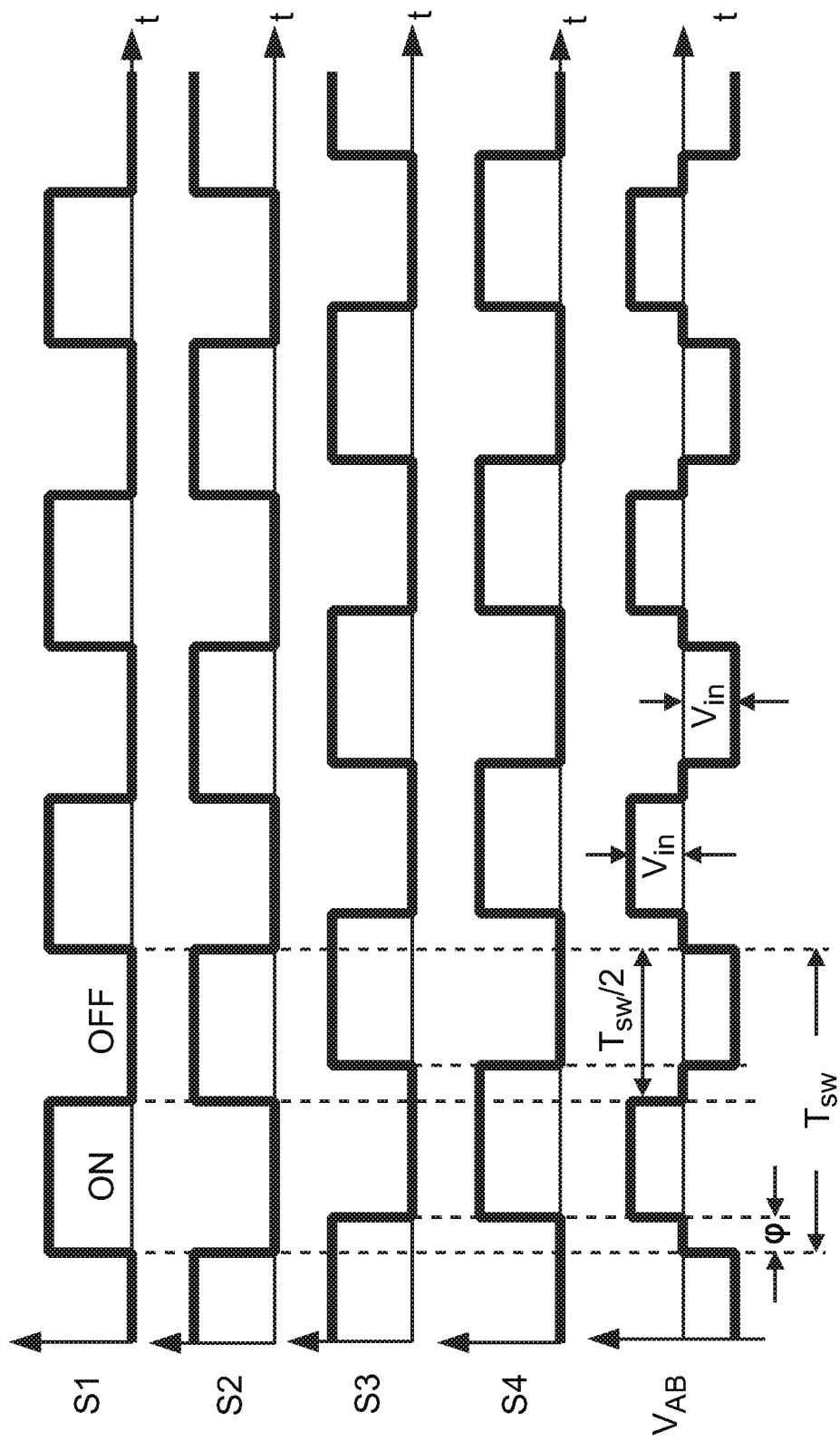
Figure 3A:
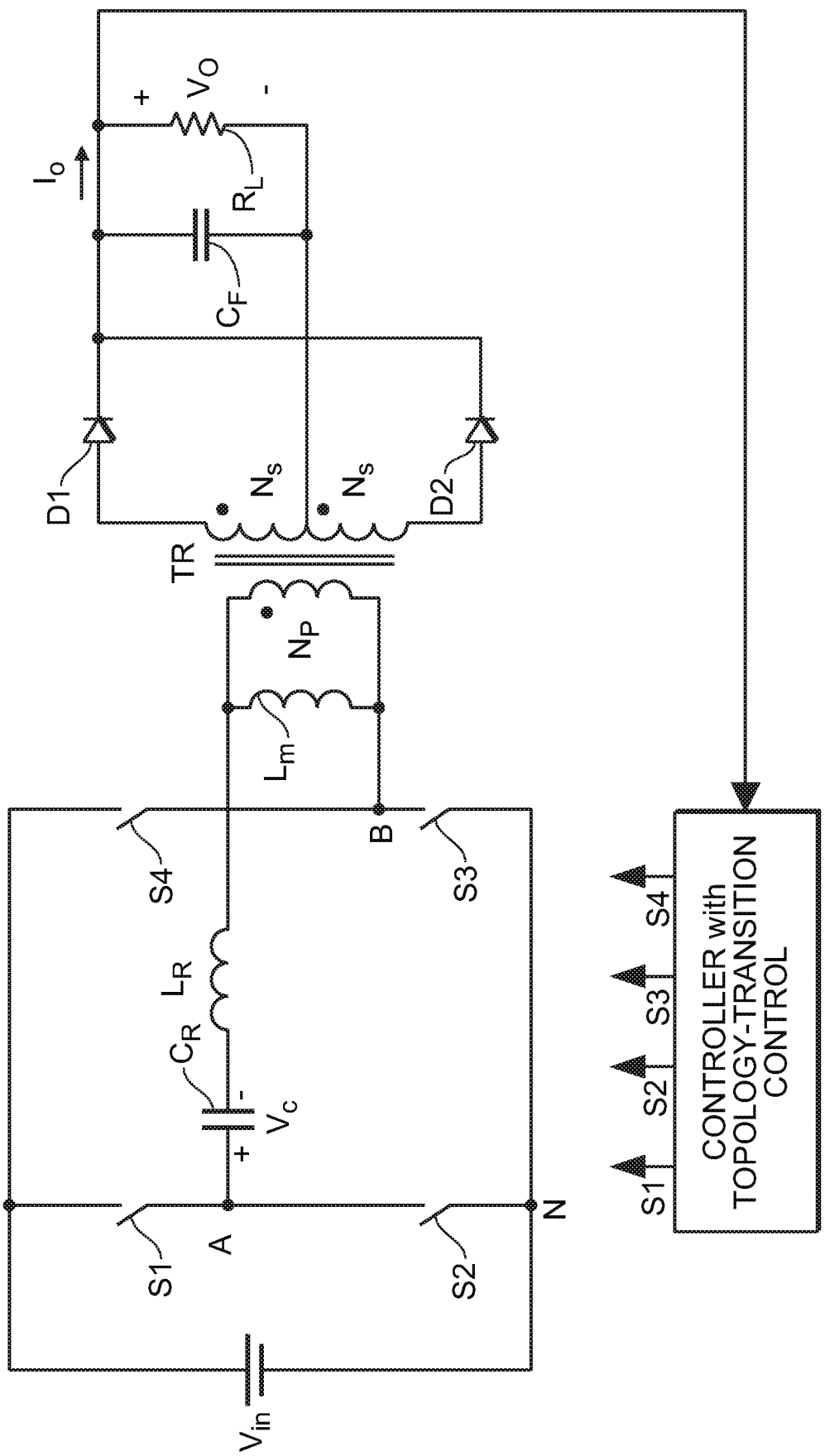
FIGS. 3(a) and 3(b) show, respectively, an exemplary conventional full-bridge LLC resonant converter under topology-morphing control, and its timing diagrams for switch control signals $S_1$ to $S_4$ and full-bridge output voltage $V_{AB}$ during a full-bridge to half-bridge topology transition.
Figure 3B:
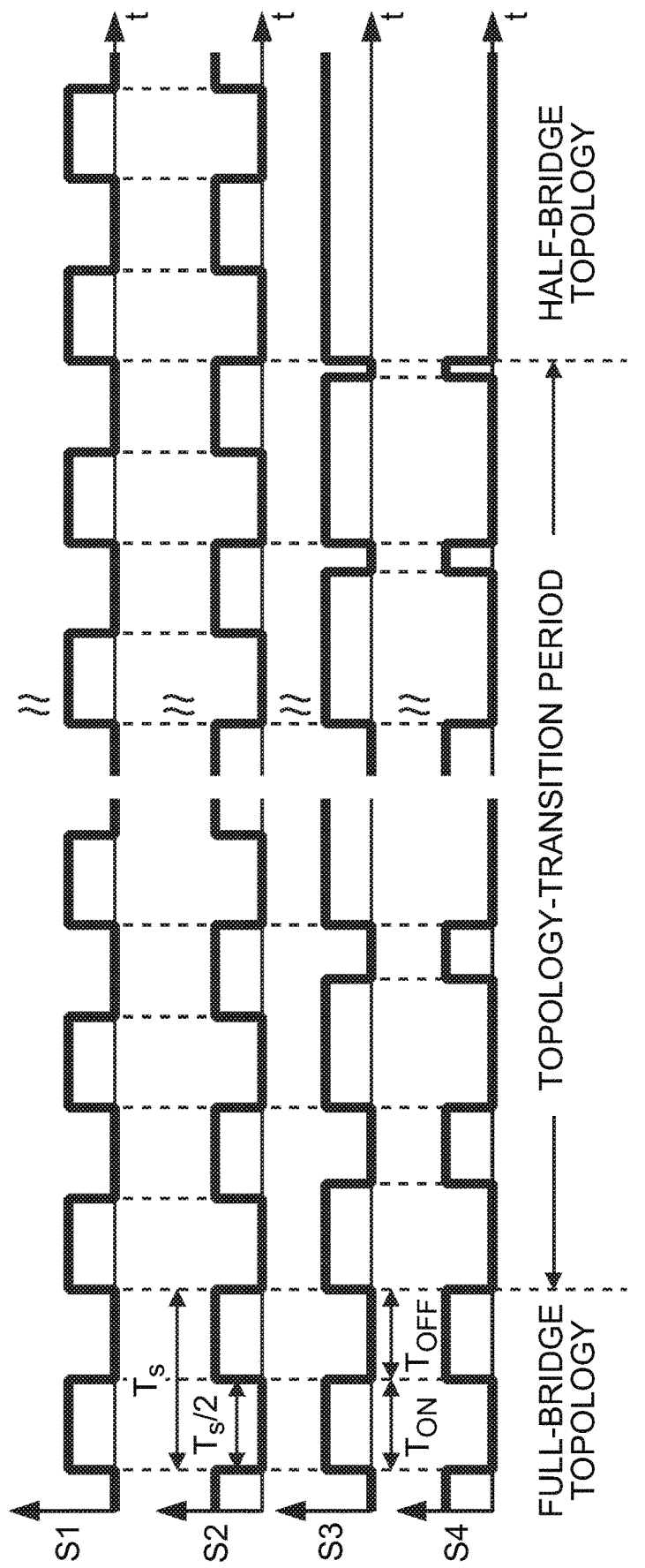
Figure 4:
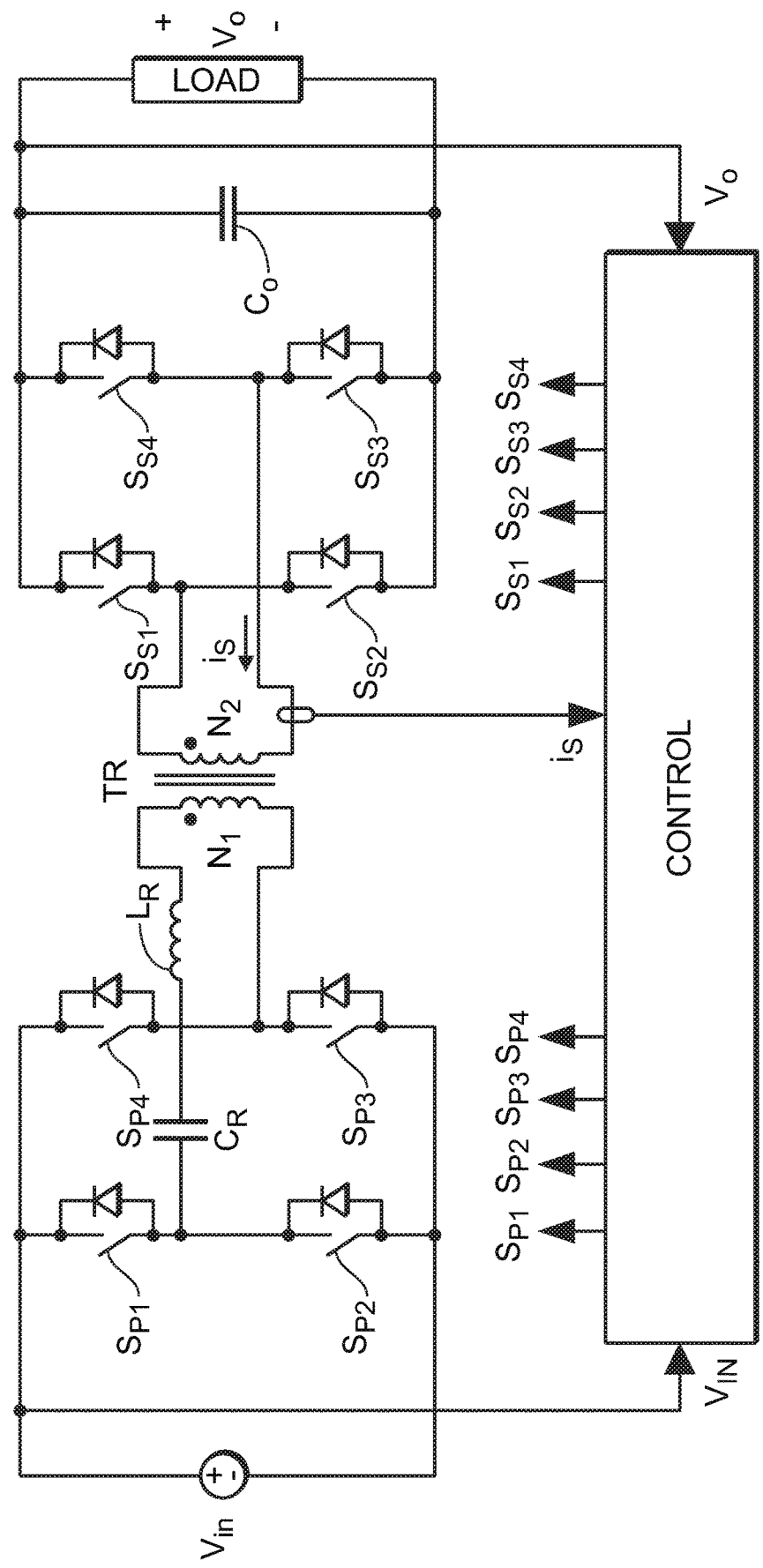
FIG. 4 shows an exemplary conventional full-bridge series-resonant converter under frequency and delay-time control.
Figure 5A:
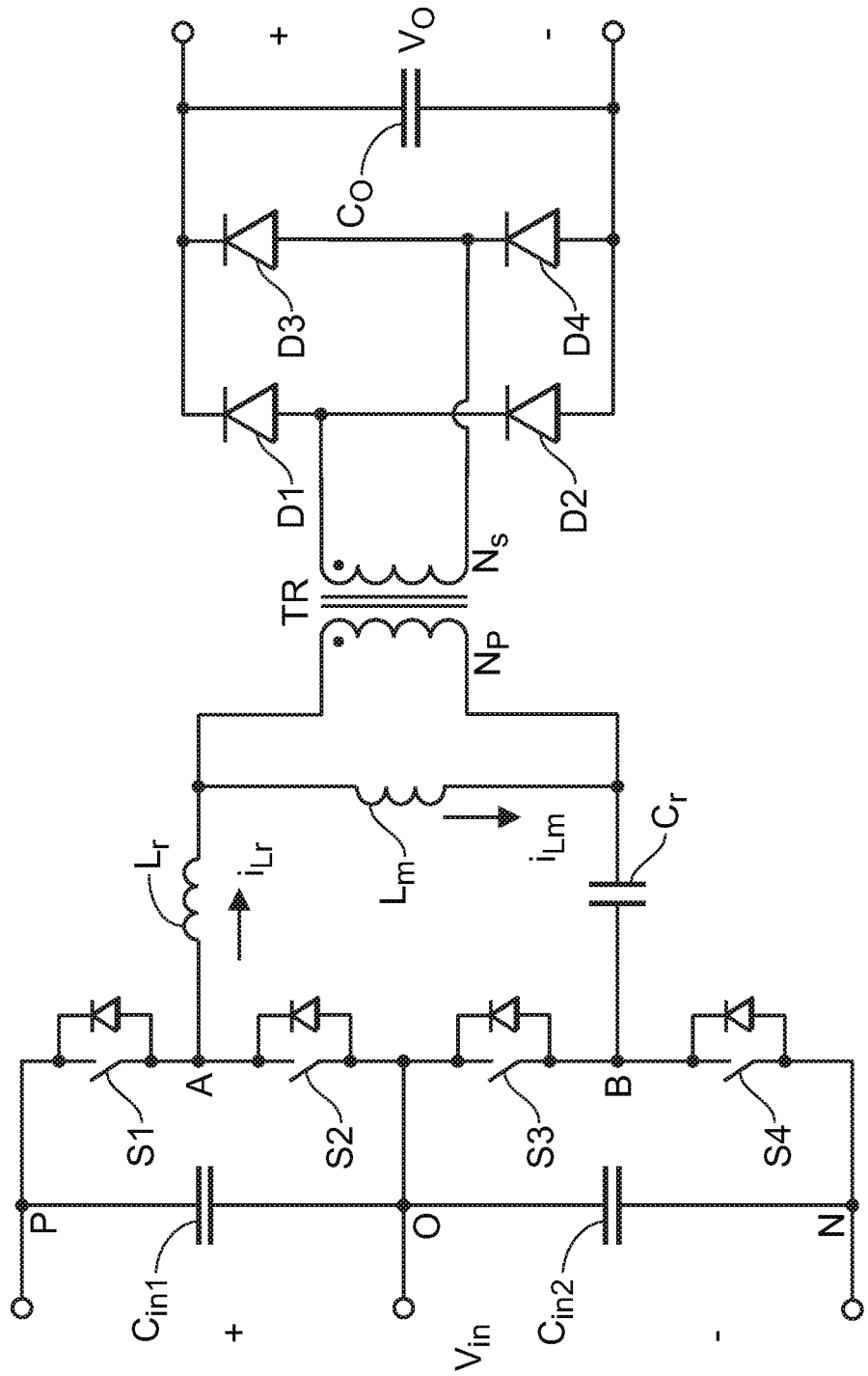
FIGS. 5(a) and 5(b) show, respectively, an exemplary serial half-bridge LLC resonant converter and its timing diagrams under asymmetric three-level control for switch control signals $S_1$ to $S_4$ and primary-side output voltage $V_{AB}$.
Figure 5B:
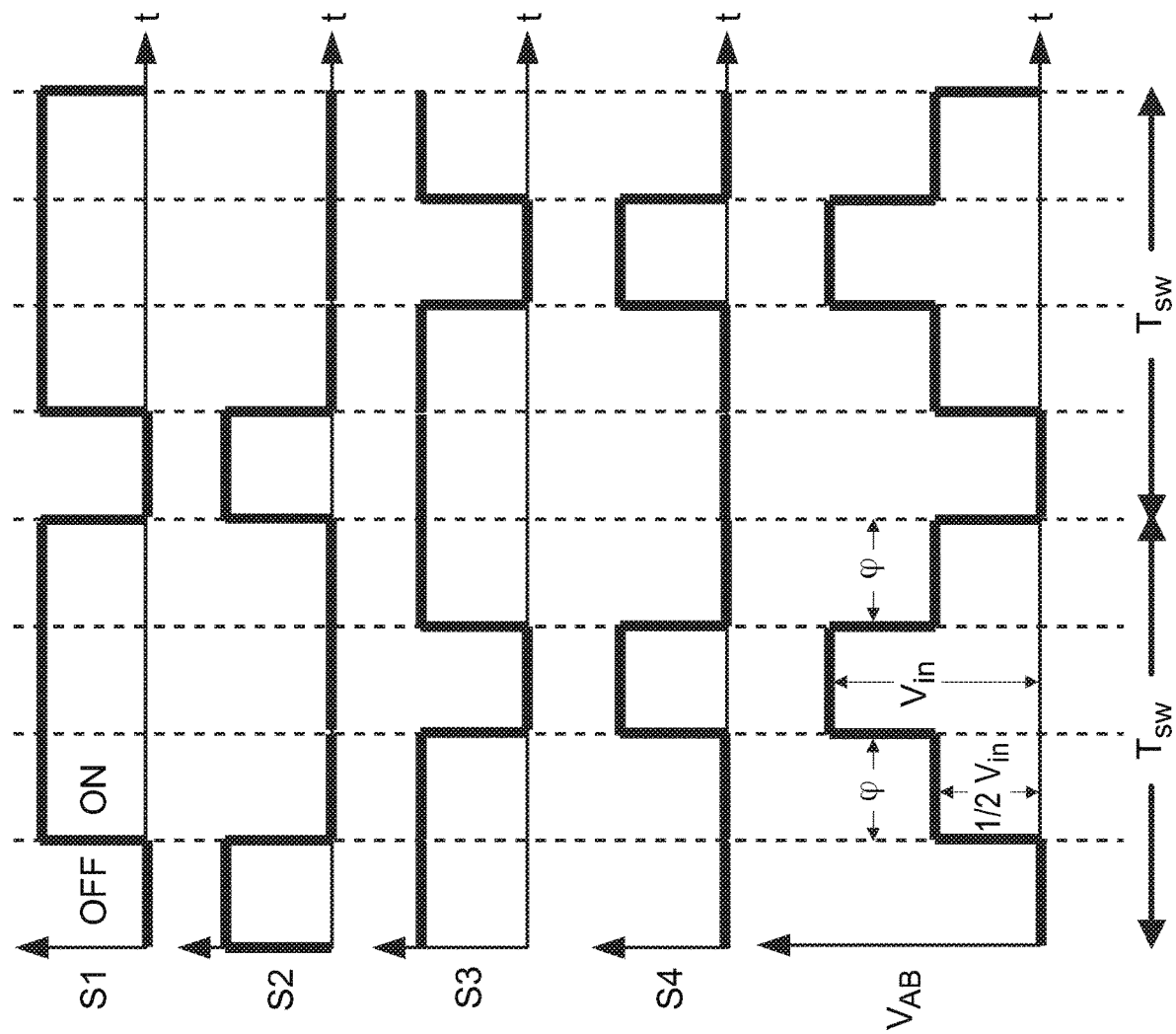
Figure 6A:
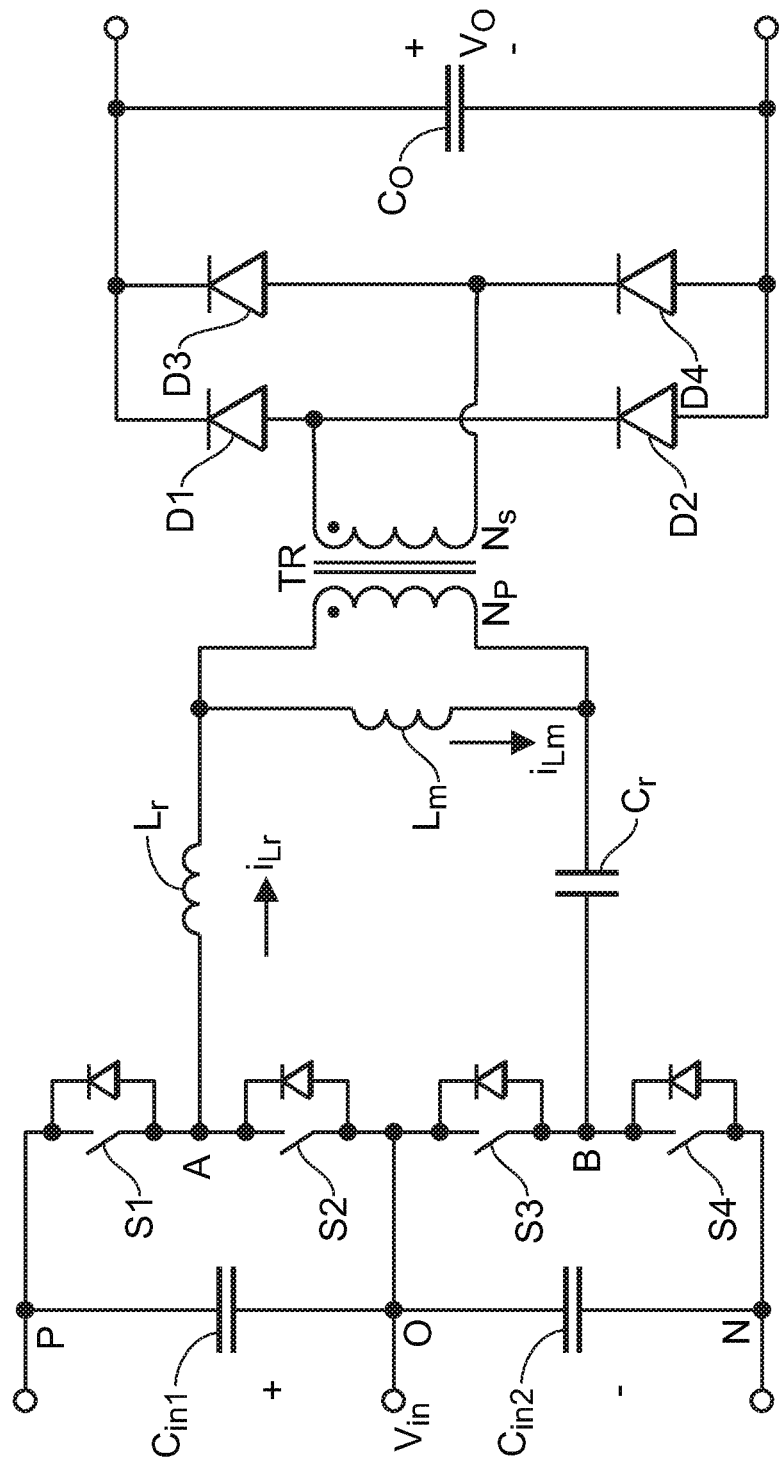
FIGS. 6(a) and 6(b) show, respectively, an exemplary serial half-bridge LLC resonant converter and its timing diagrams under periodically swapping three-level control for switch control signals $S_1$ to $S_4$ and primary-side output voltage $V_{AB}$.
Figure 6B:
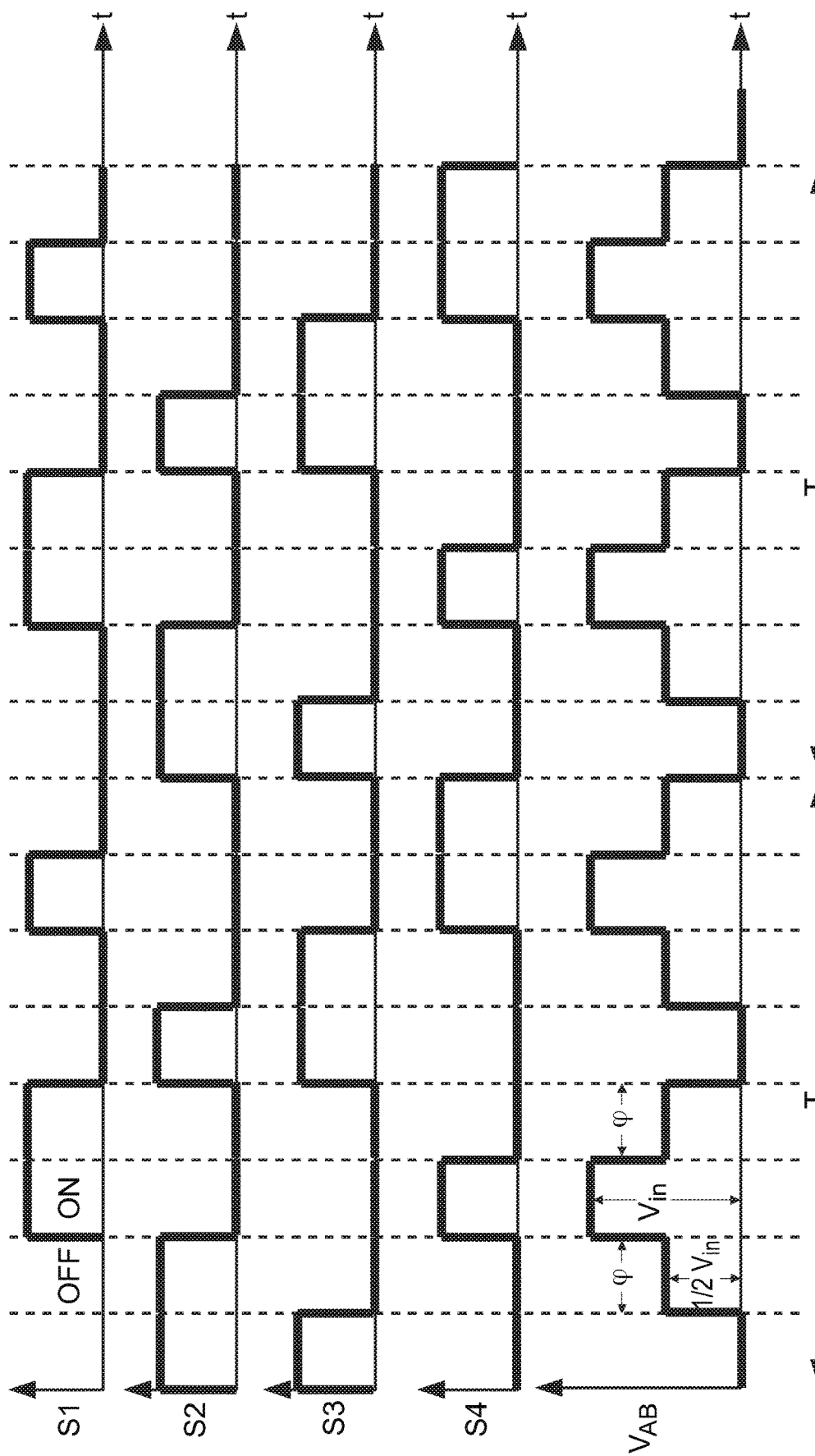
Figure 7A:
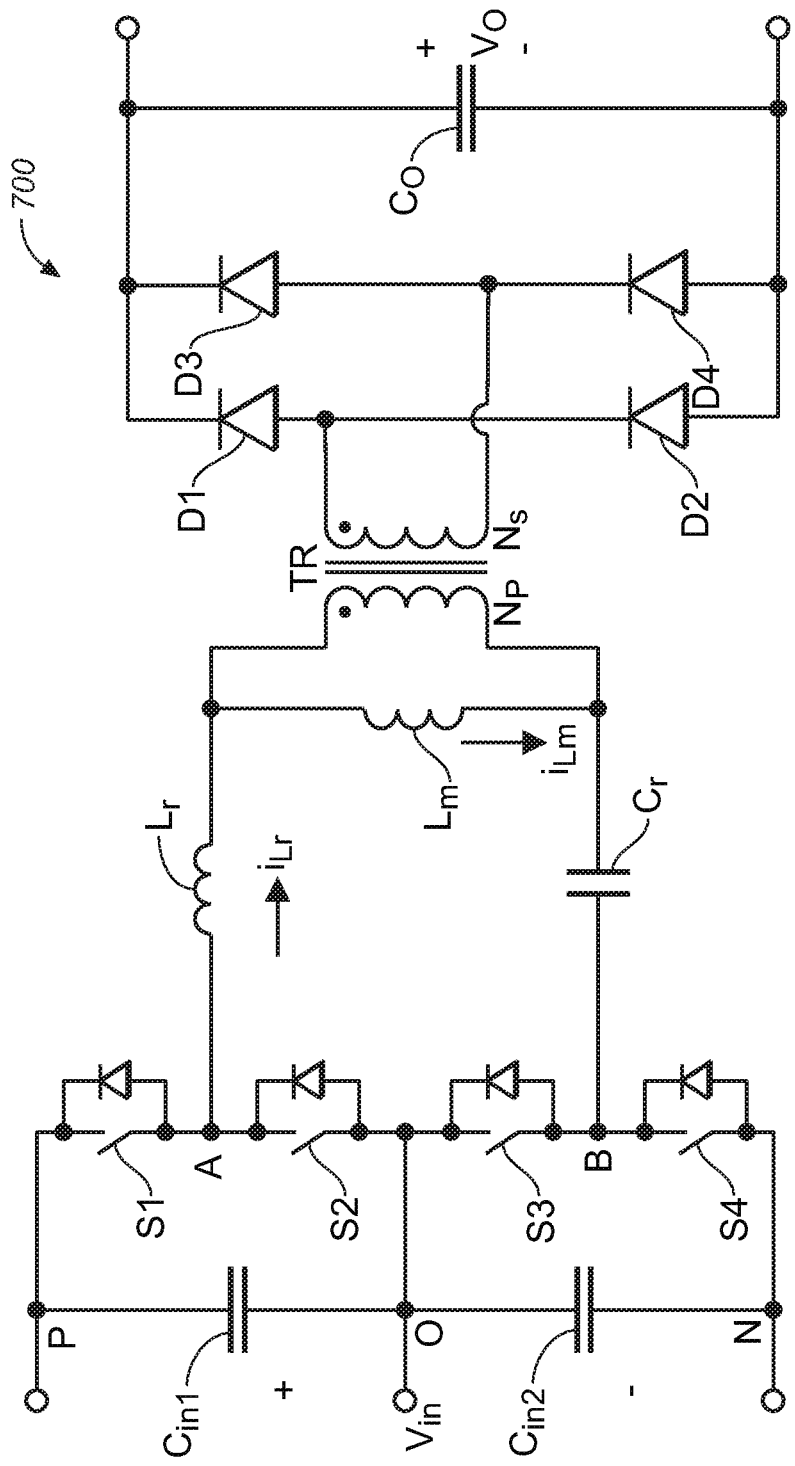
FIGS. 7(a) and 7(b) show, respectively, serial half-bridge LLC resonant converter 700 and its timing diagrams of (i) the control signals for primary switches $S_1$ to $S_4$, under a three-level modulation scheme, and (ii) primary-side output voltage $V_{AB}$.

7(a) shows a 3-level SHB topology (also known as "stacked buck topology") that provides SHB LLC converter 700 that has on the primary-side a serial half-bridge. As shown in FIG. 7(a), the serial half-bridge includes four series-connected switches $S_1$ to $S_4$, configured such that each switch blocks one-half of the input voltage across terminals P and N. Input terminals P and N are provided across series-connected input capacitors $C_{in1}$ and $C_{in2}$, and across switches $S_1$ and $S_4$. The common terminal of capacitors $C_{in1}$ and $C_{in2}$ is also the common terminal between switches $S_2$ and $S_3$, such that capacitor $C_{in1}$ is connected in parallel with switches $S_1$ and $S_2$, and capacitor $C_{in2}$ is connected in parallel with switches $S_3$ and $S_4$. A full-bridge diode rectifier $D_1$ to $D_4$ is provided on the secondary side.

A first phase-leg output terminal A is provided at the common terminal between switches $S_1$ and $S_2$, while a second phase-leg output terminal B is provided at the common terminal between switches $S_3$ and $S_4$. Connected across terminals A and B is a resonant circuit formed by transformer TR and series-connected resonant inductor $L_r$, resonant capacitor $C_r$ and transformer magnetizing inductor $L_m$. The primary-side winding of transformer TR is connected in parallel with the magnetizing inductor $L_m$. The secondary-side winding of transformer TR may be either (i) a center-tapped winding with two rectification components, or (ii) a single winding with a full-bridge rectifier. Switches $S_1$ to $S_4$ each block its share of the input voltage in one direction, but each conduct a current in both directions. Switches $S_1$ to $S_4$ may each be implemented by a semiconductor switch (e.g., MOSFET, IGBT, BJT or another semiconductor switch). Alternately, instead of a diode rectifier circuit, the secondary side may be implemented by a synchronous rectifier circuit, which reduces conduction loss.

2. Three-Level Modulation

Figure 7B:
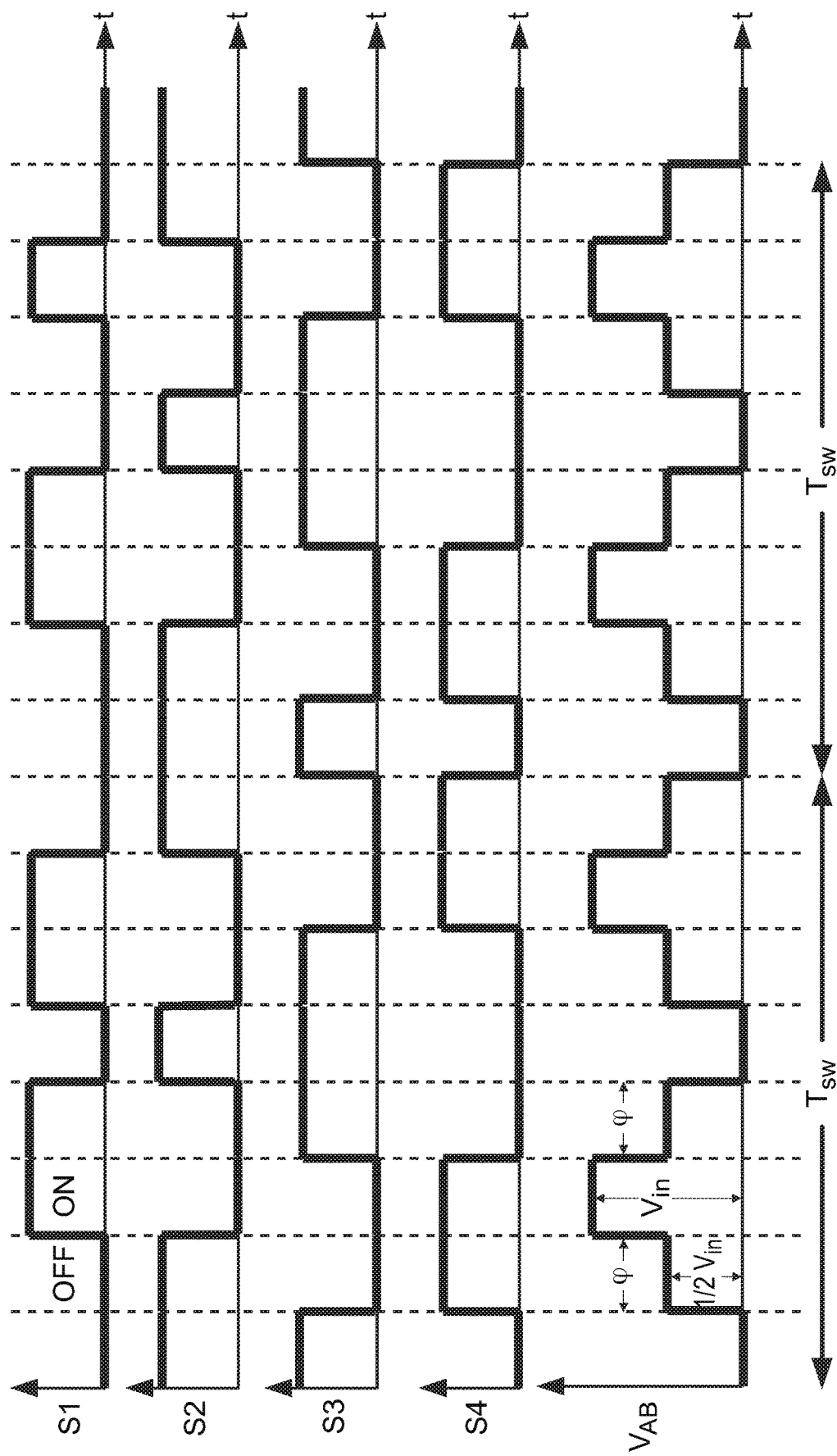

According to one embodiment of the present invention, FIG. 7(b) illustrates a three-level modulation scheme for the signals operating primary switches $S_1$, $S_2$, $S_3$ and $S_4$ of SHB LLC resonant converter 700 of FIG. 7(a). The signals that operate switches $S_1$ and $S_2$ are complementary, and the signals for operating switches $S_3$ and $S_4$ are also complementary. In practice, a small dead-time is inserted between each pair of complementary switch signals to avoid a phase-leg shoot-through. In this embodiment, based on the output voltage or the output current, the control circuit is configurable to generate the first, second, third, and fourth switch control signals $S_1$ to $S_4$ according to a first modulation scheme in which (i) the first and the second switch control signals $S_1$, $S_2$ are substantially complementary with each other and the third and the fourth switch control signals $S_3$, $S_4$ are substantially complementary with each other, (ii) the first, second, third, and fourth switch control signals $S_1$, $S_2$, $S_3$, $S_4$ are periodic with a common switching period $T_{sw}$, (iii) within the common switching period $T_{sw}$, (1) each switch control signal has two rising edges and two falling edges; and (2) the first rising edge of the first switch control signal $S_1$ lags the first rising edge of the fourth switch control signal $S_4$ by a first predetermined time, while the second rising edge of the first switch control signal $S_1$ leads the second rising edge for the fourth switch control signal $S_4$ by a second predetermined time, and (iv) the control circuit varies the switching period, the first predetermined time, and the second predetermined time.

FIG. 7(b) shows the timing diagrams of the signals to primary switches $S_1$ to $S_4$ and SHB phase-leg output voltage $V_{AB}$. In switching period $T_{sw}$, each of primary switches $S_1$, $S_2$, $S_3$ and $S_4$ is turned on twice and turned off twice. Each time it is turned on, primary switch $S_1$ or $S_4$ has a fixed "on" duration that spans 25% of switching period $T_{sw}$, such that the accumulated "on" duration is 50% of switching period $T_{sw}$. As shown in FIG. 7(b), during switching period $T_{sw}$, the first rising edge for primary switch $S_1$ lags the first of rising edge for primary switch $S_4$, while the second rising edge for primary switch $S_1$ leads the second rising edge for primary switch $S_4$. The lead and the lag times are each φ, as shown in FIG. 7(b). In addition, the first rising edge for primary switch $S_1$ leads the second rising edge for primary switch $S_4$ by ½ $T_{sw}$. Operating primary switches $S_1$, $S_2$, $S_3$, and $S_4$ in this manner, phase-leg output voltage $V_{AB}$ has three different voltage levels. In this embodiment, when the first and the fourth switching devices $S_1$, $S_4$ are both non-conducting, the voltage across the first and second electrical nodes goes to a first voltage level, (ii) when one of the first and the fourth switching devices $S_1$, $S_4$ is conducting, the voltage across the first and second electrical nodes goes to a second voltage level, and (iii) when the first and the fourth switching devices $S_1$, $S_4$ are both conducting, the voltage across the first electrical node goes to a third voltage level. The first voltage level may be ground, the second voltage level may be substantially one-half the input signal, and the second voltage level may be substantially the input signal. When primary switches $S_1$ and $S_4$ are both "on" or conducting, phase-leg output voltage $V_{AB}$ equals $V_{in}$. When primary switch $S_2$ and $S_4$ are both "on," or when primary switches $S_1$ and $S_3$ are both "on," phase-leg output voltage $V_{AB}$ equals $0.5V_{in}$. When primary switches $S_2$ and $S_3$ are both "on", phase-leg output voltage $V_{AB}$ equals zero volts.

Thus, the waveform of phase-leg output voltage $V_{AB}$ is periodical with a period that is half switching period $T_{sw}$. As duration φ corresponds to the duration when primary switches $S_2$ and $S_4$ are both "on," or when primary switches $S_1$ and $S_3$ are both "on," duration φ determines the duration over which phase-leg output voltage $V_{AB}$ equals ½$V_{in}$. Switching frequency $f_{sw}$ (hence, switching period $T_{sw}$) and duration φ are the control variables for setting different control targets.

3. Key Waveforms and Stages Analysis

In this detailed description, to simplify the analysis of the operations, ripple voltages of input capacitor $C_{in}$ and output capacitor $C_O$, as shown in FIG. 7(a), are assumed negligible and thus may be represented by constant-voltage source $V_{in}$ and $V_o$. Also, the semiconductor circuit elements herein are each assumed to have zero resistance in its "on" or conducting state (i.e., they are considered short circuits). However, the output capacitances of the primary switches are not neglected.

Figure 8:
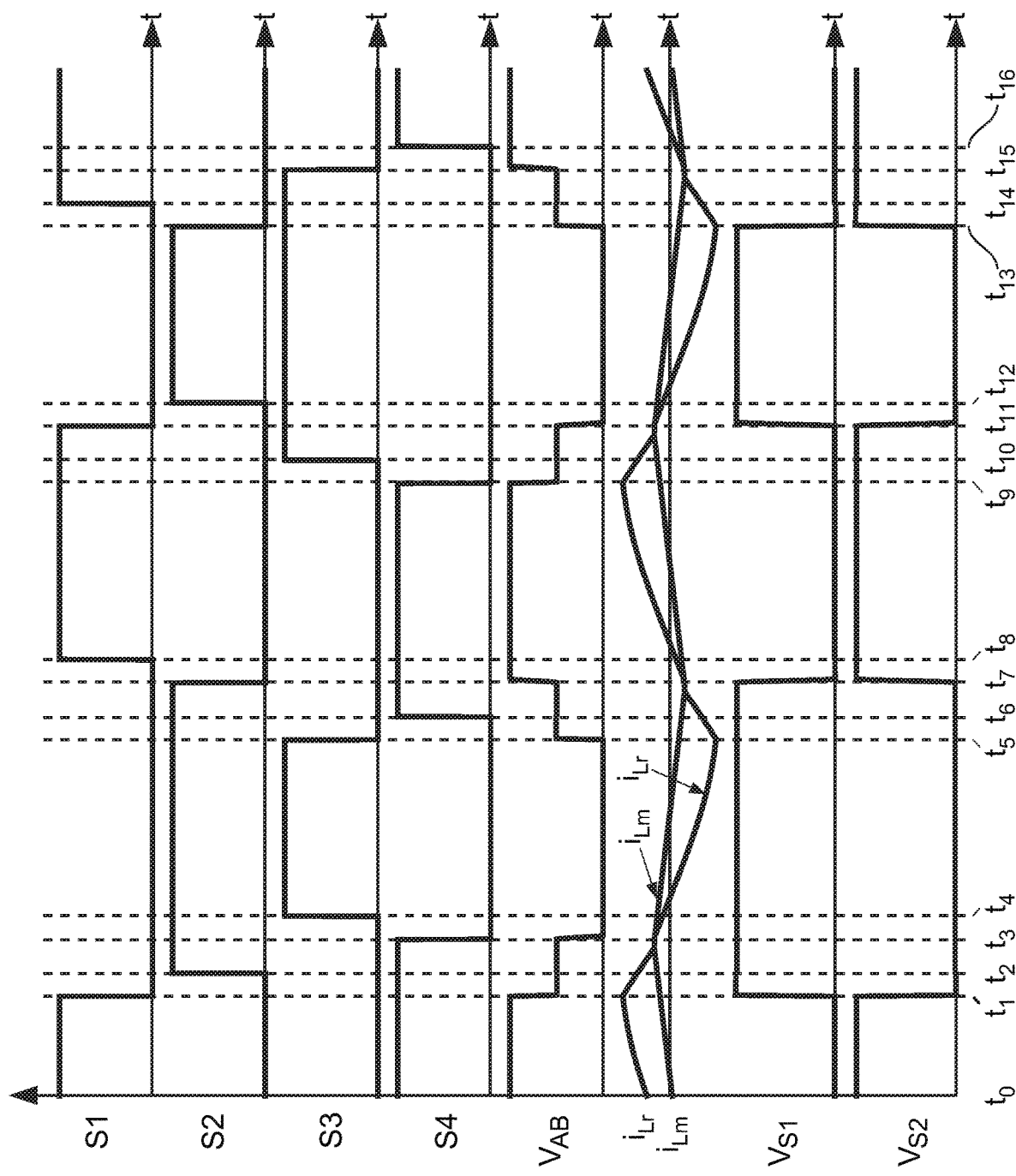
FIG. 8 shows key waveforms of SHB LLC resonant converter 700 of FIG. 7(a) during switching cycle $T_{sw}$.

FIG. 8 shows key waveforms of SHB LLC resonant converter 700 of FIG. 7(a) during switching cycle $T_{sw}$. FIG. 8 shows switch control voltages $S_1$, $S_2$, $S_3$ and $S_4$ (i.e., positive voltages indicate primary switches $S_1$ to $S_4$, respectively, to be in the "on" state), primary-side output voltage $V_{AB}$, current $I_{Lr}$ in resonant inductor $L_r$, current $I_{Lm}$ in magnetizing inductor $L_m$, and voltages $V_{S1}$ and $V_{S2}$ across primary switches $S_1$ and $S_2$. FIG. 8 indicates signal transitions at times $t_1$, $t_2$, $t_3$, $t_4$, $t_5$, $t_6$, $t_7$, $t_8$, $t_9$, $t_{10}$, $t_{11}$, $t_{12}$, $t_{13}$, $t_{14}$, $t_{15}$, and $t_{16}$.

Figure 9A:
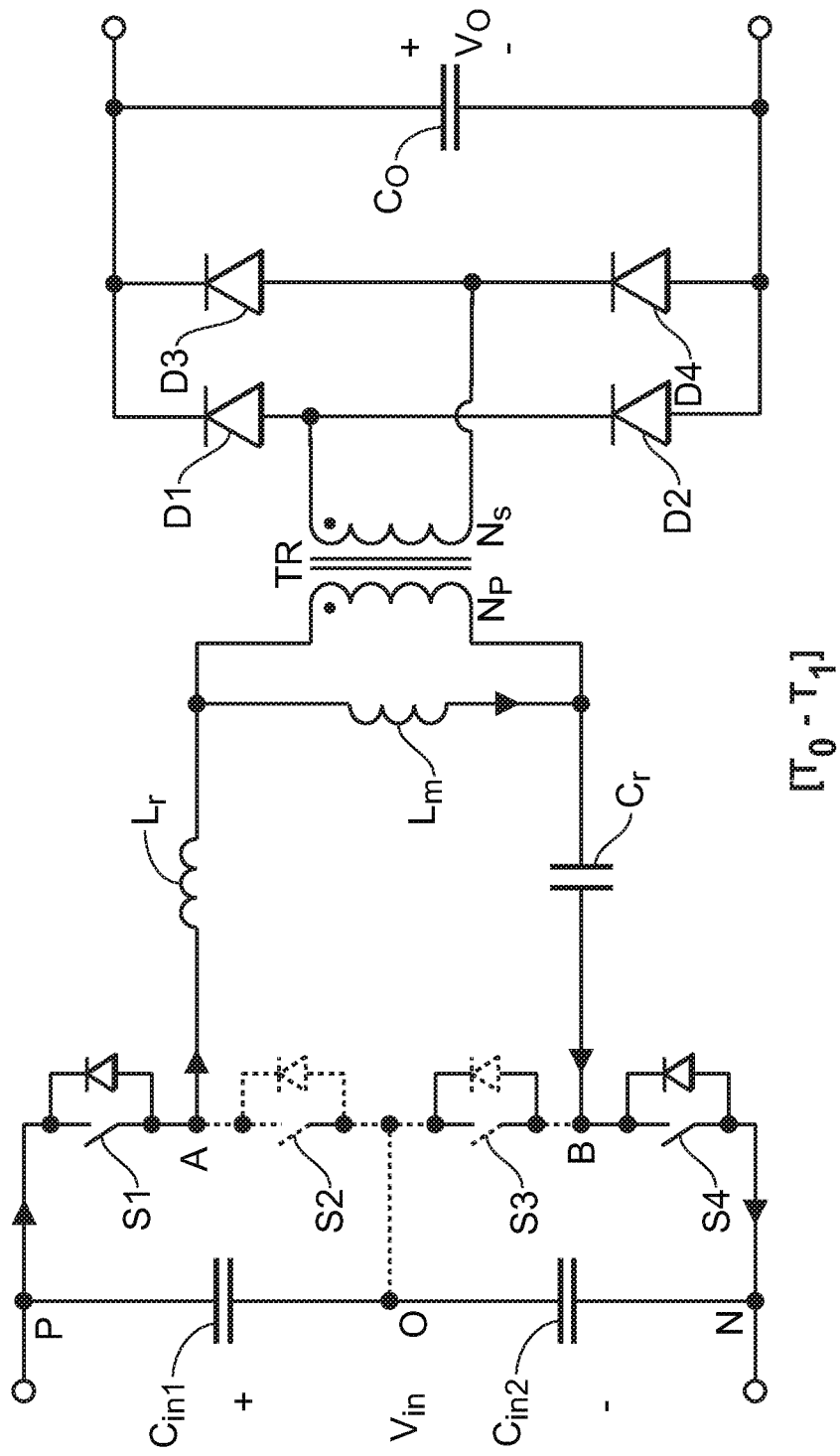
Figure 9B:
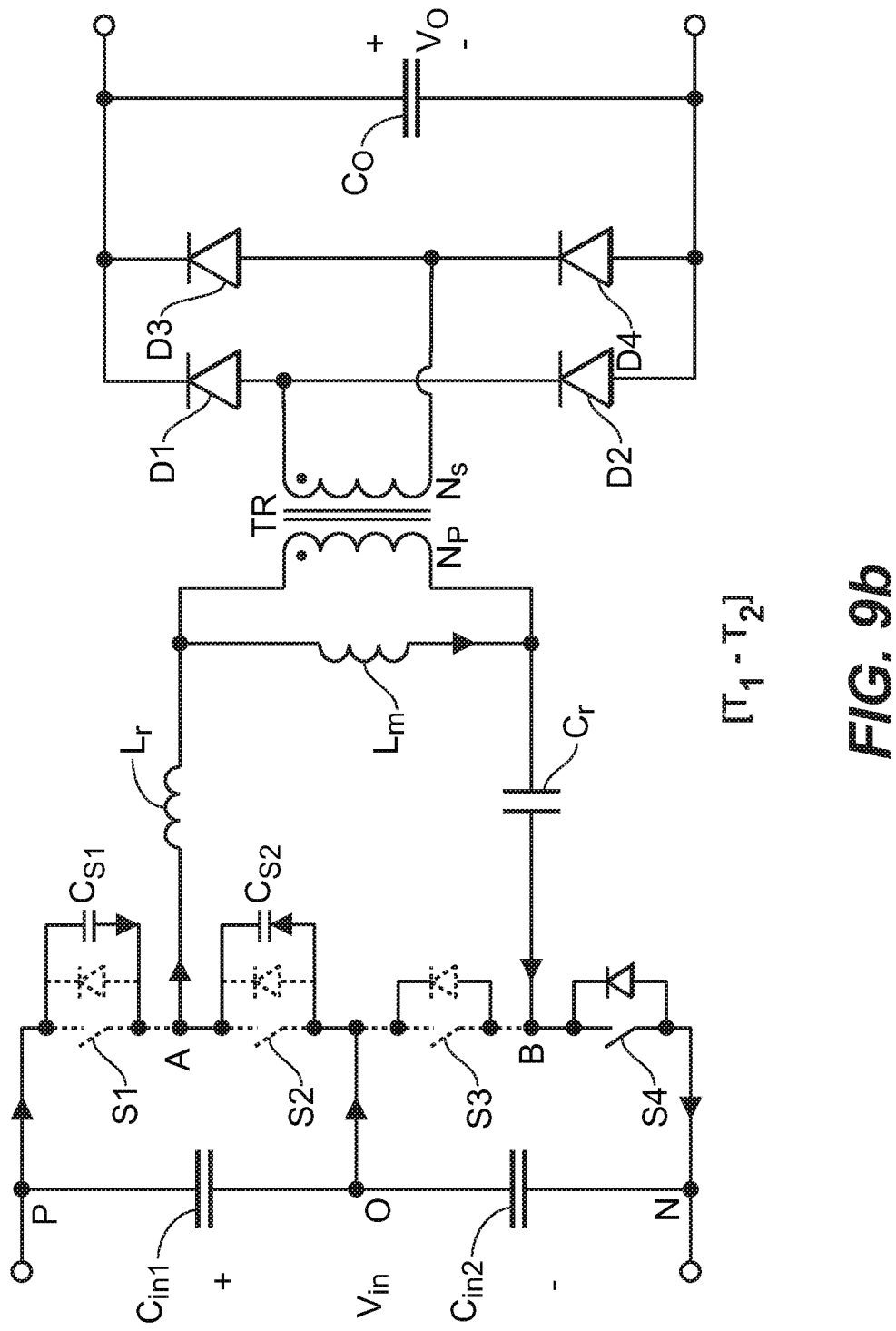
Figure 9C:
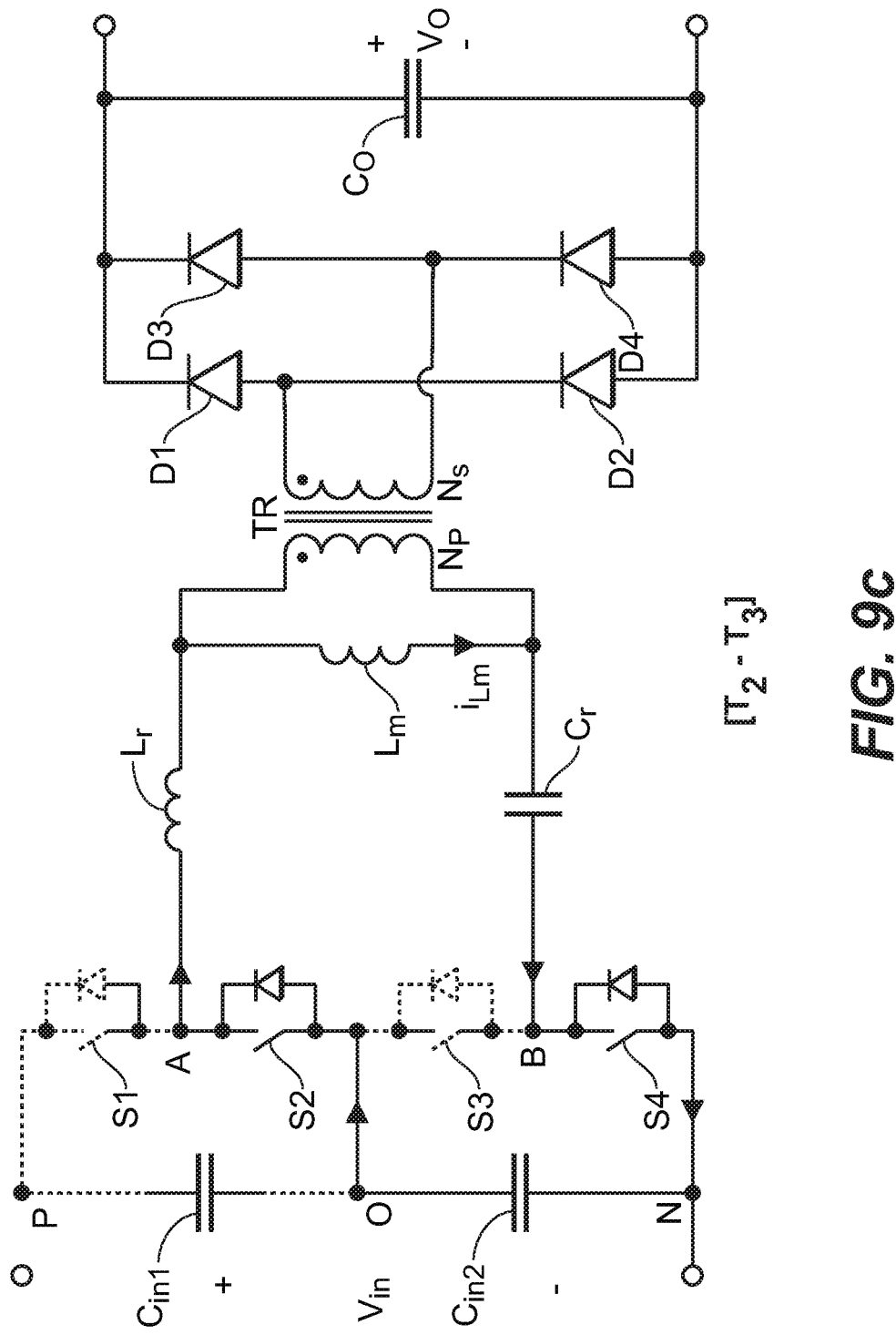
Figure 9D:
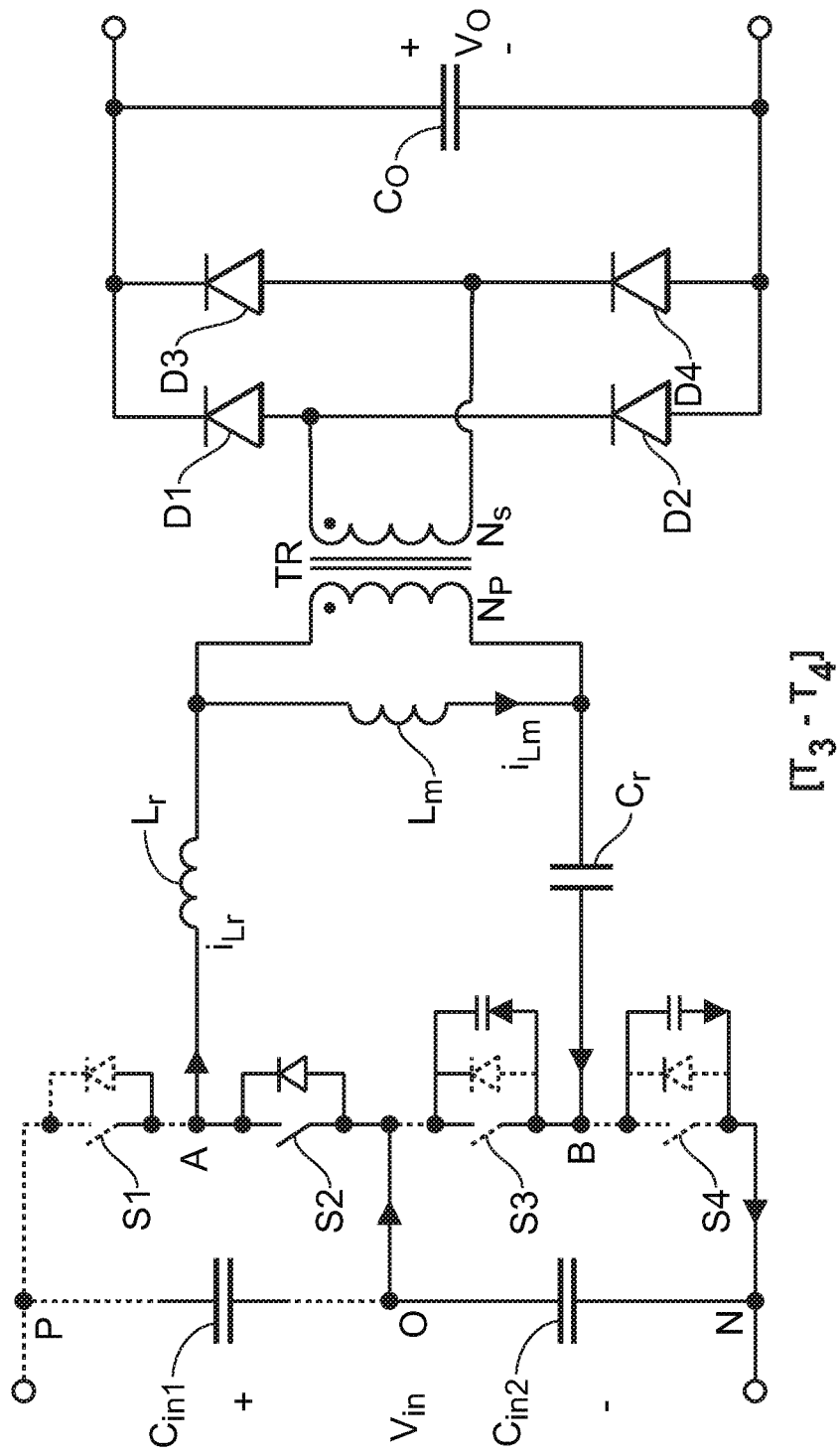
Figure 9E:
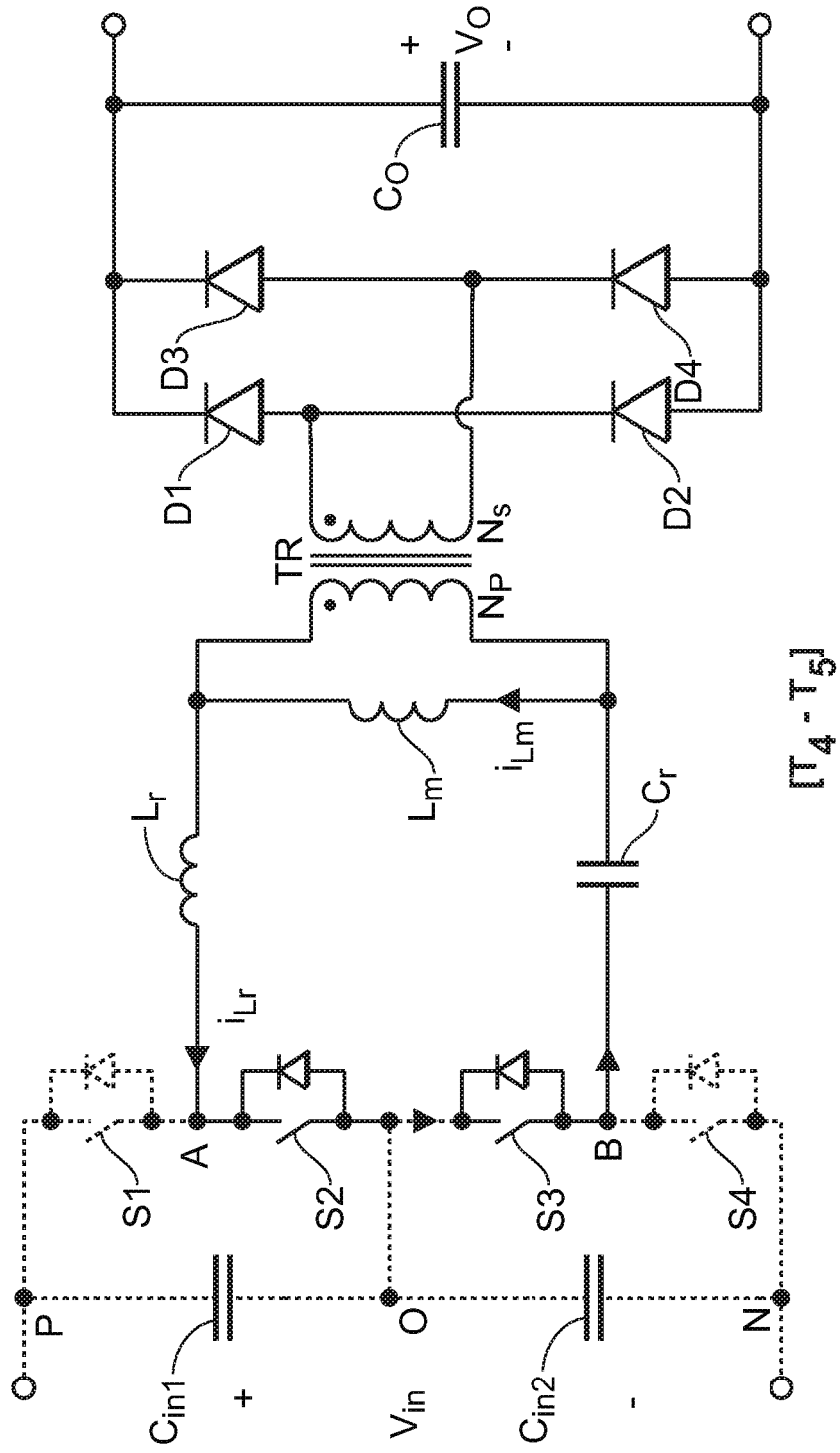
Figure 9F:
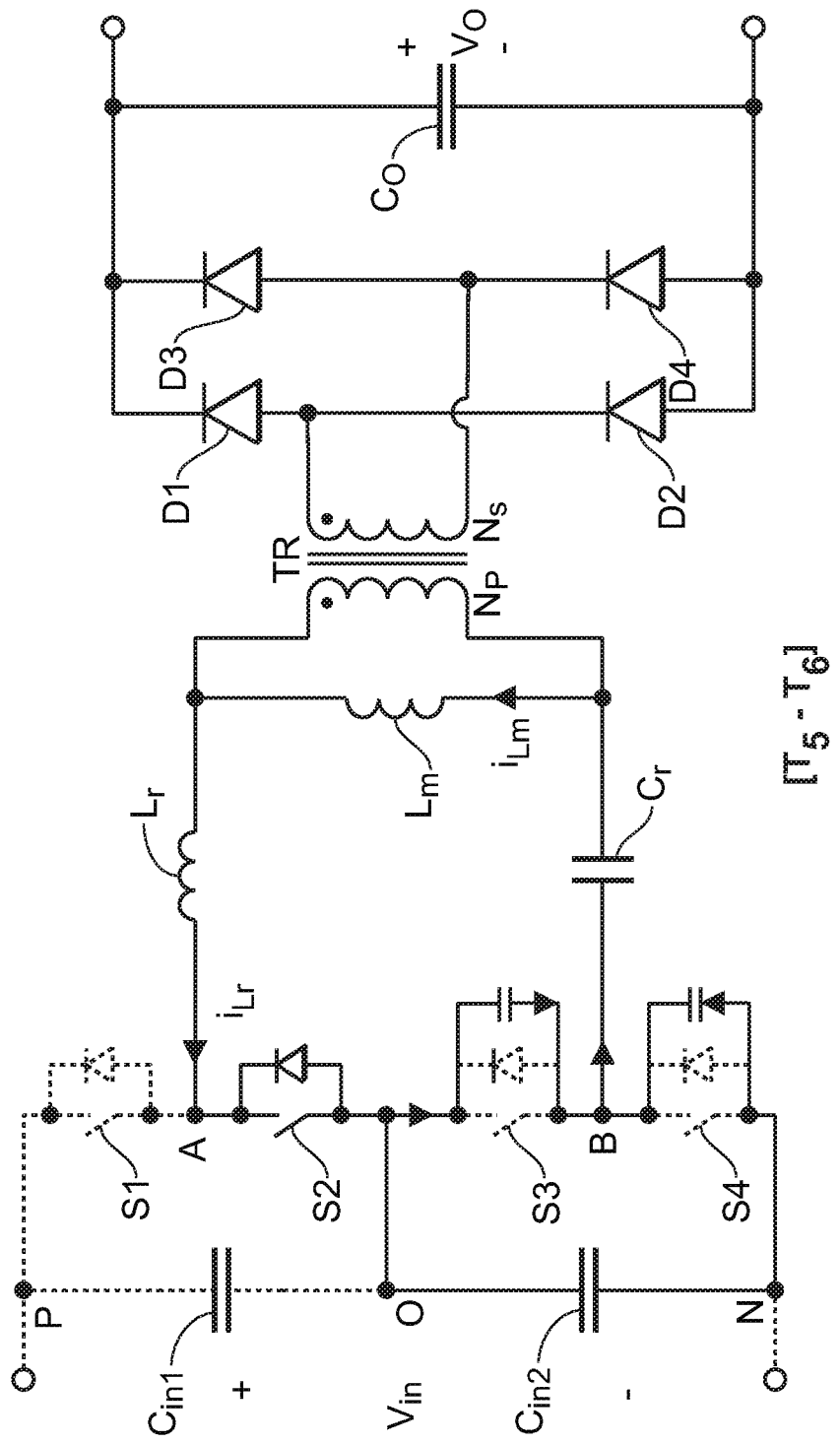
Figure 9G:
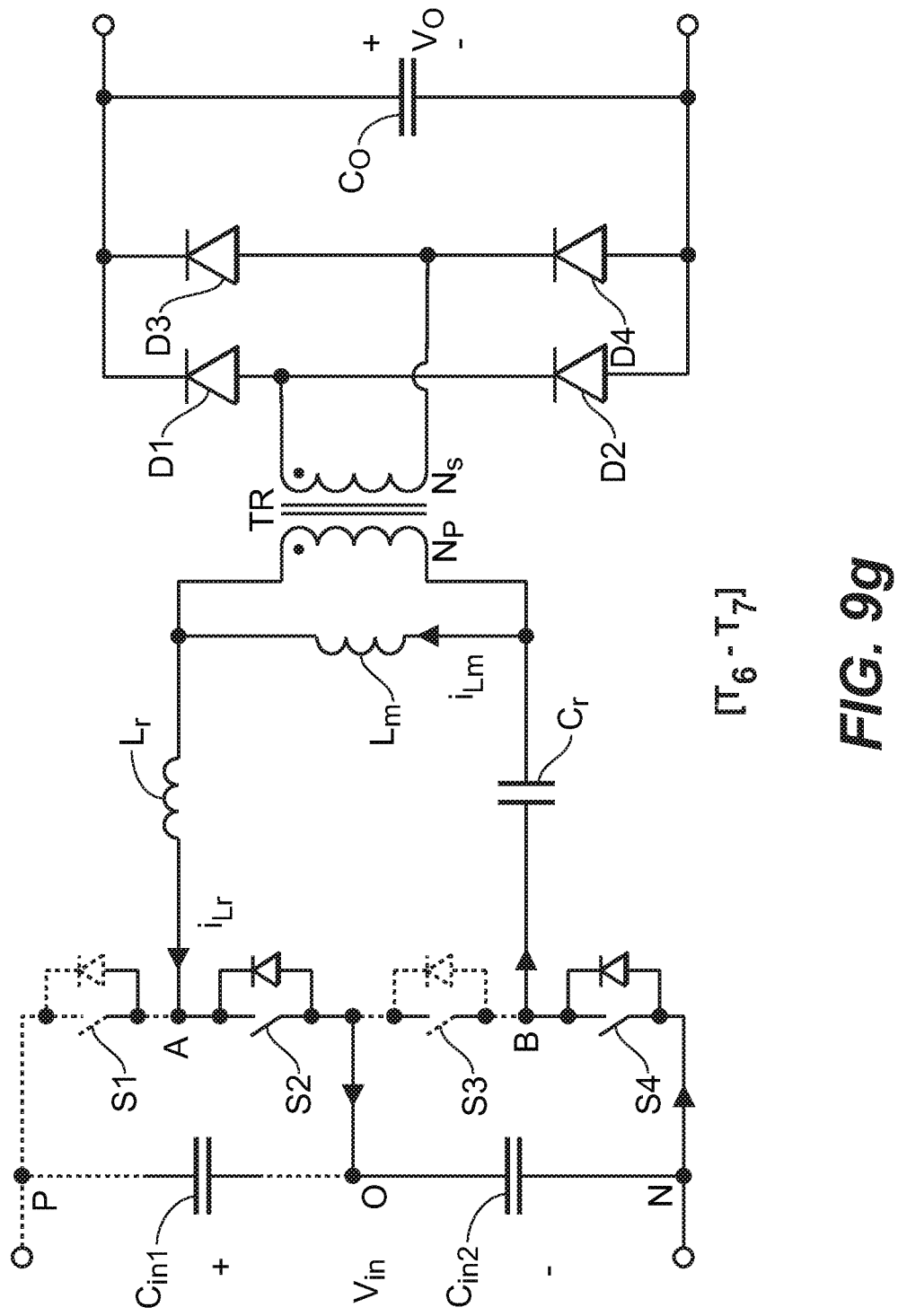
Figure 9H:
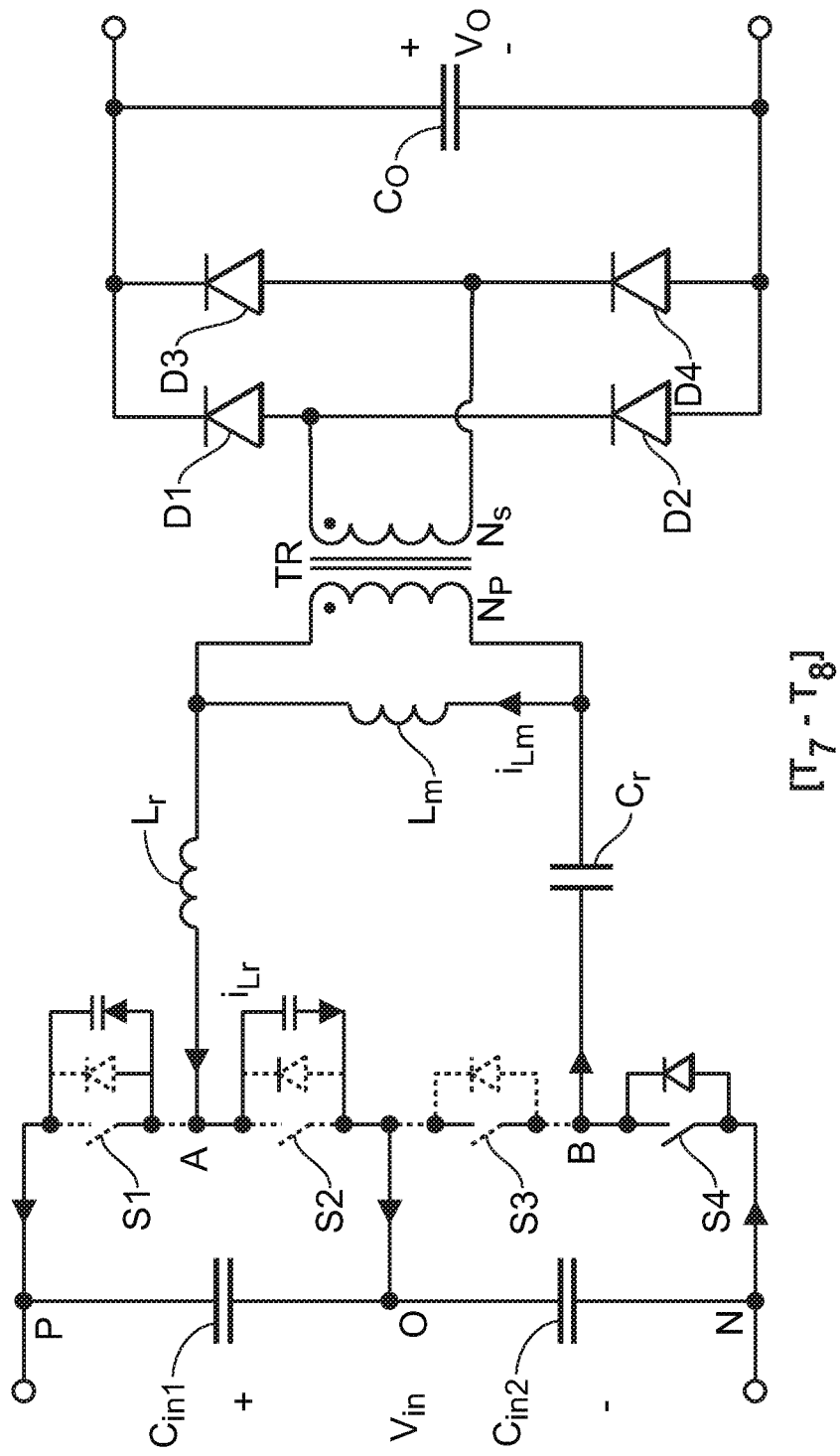
Figure 9I:
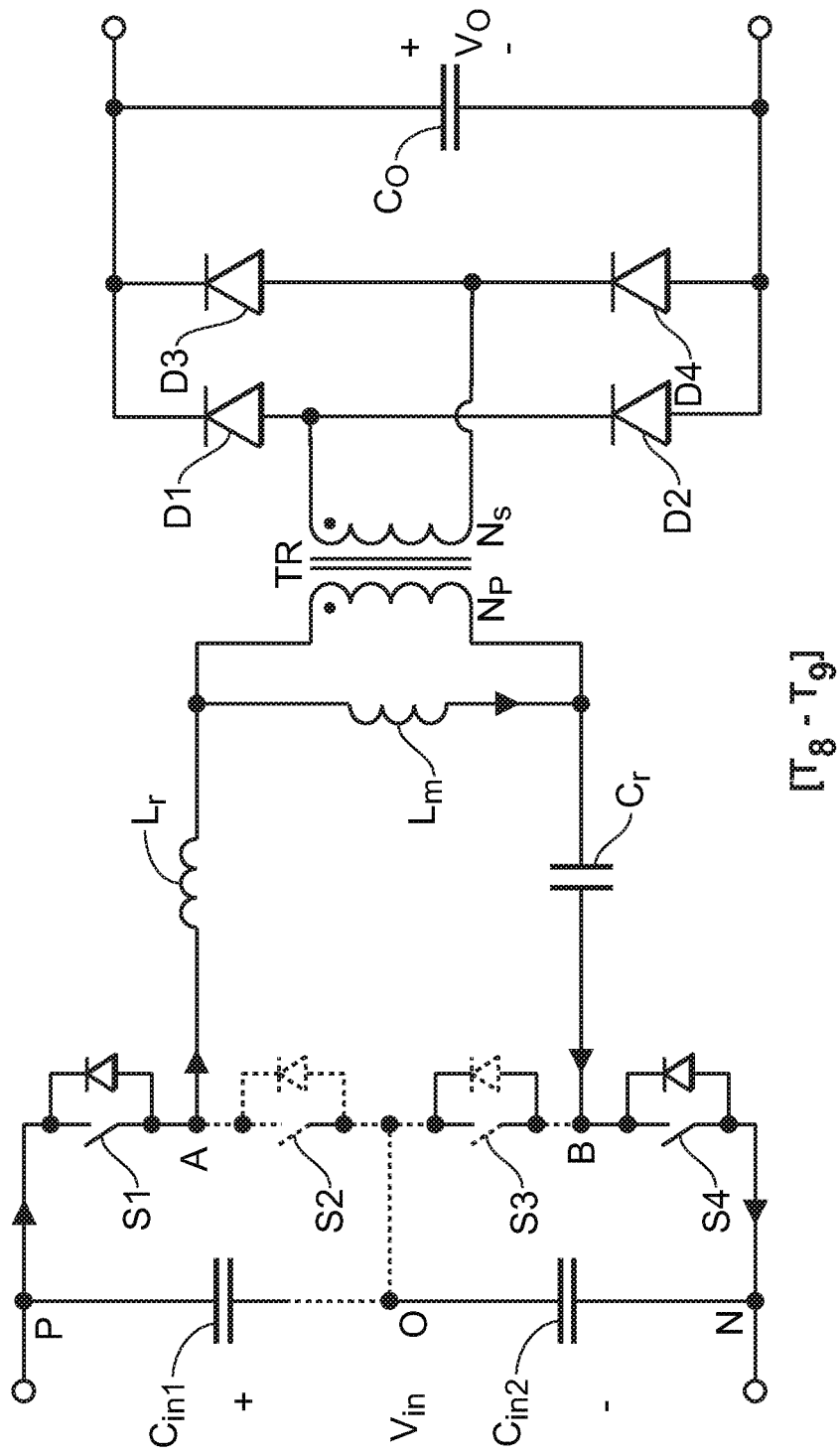
Figure 9J:
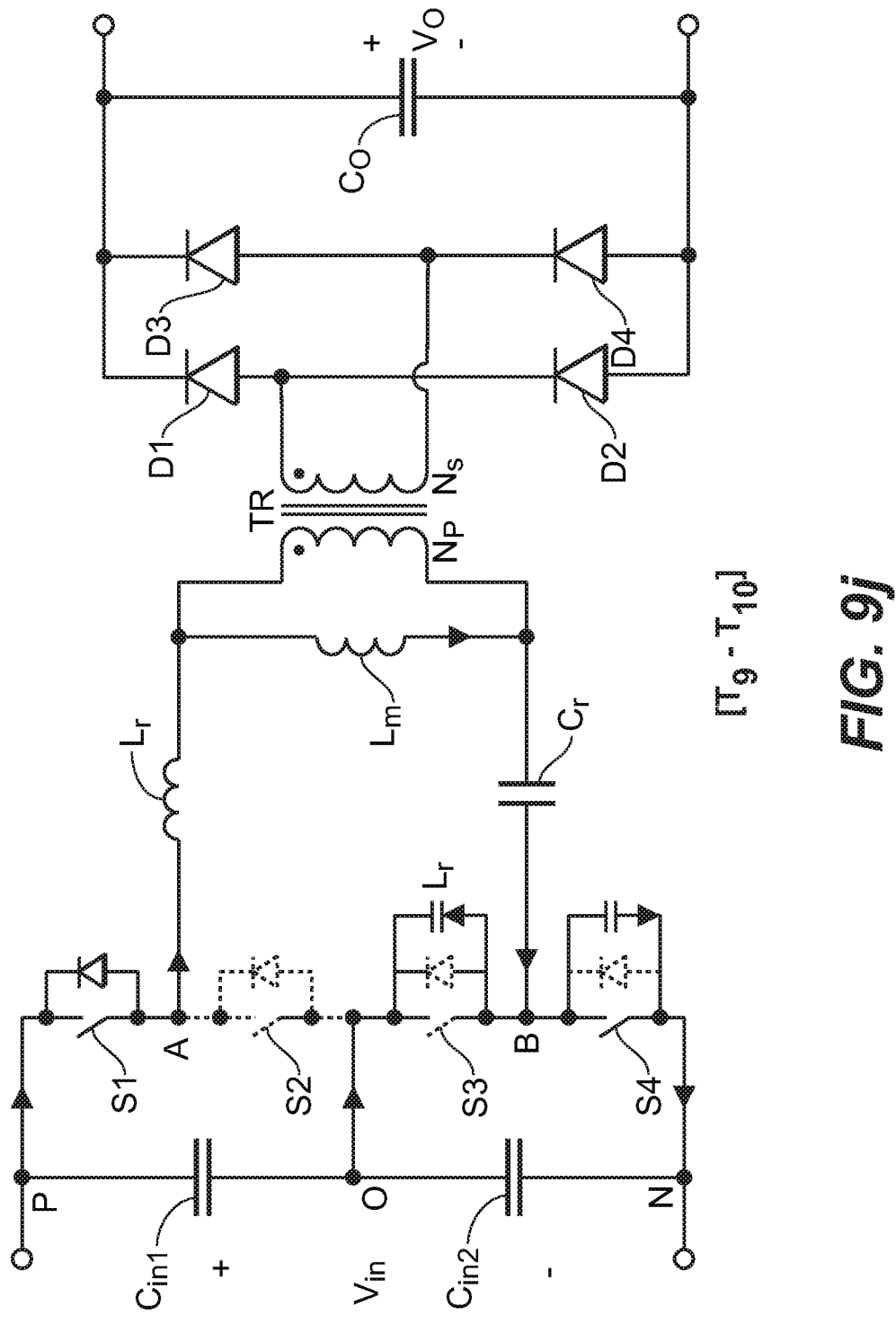
Figure 9K:
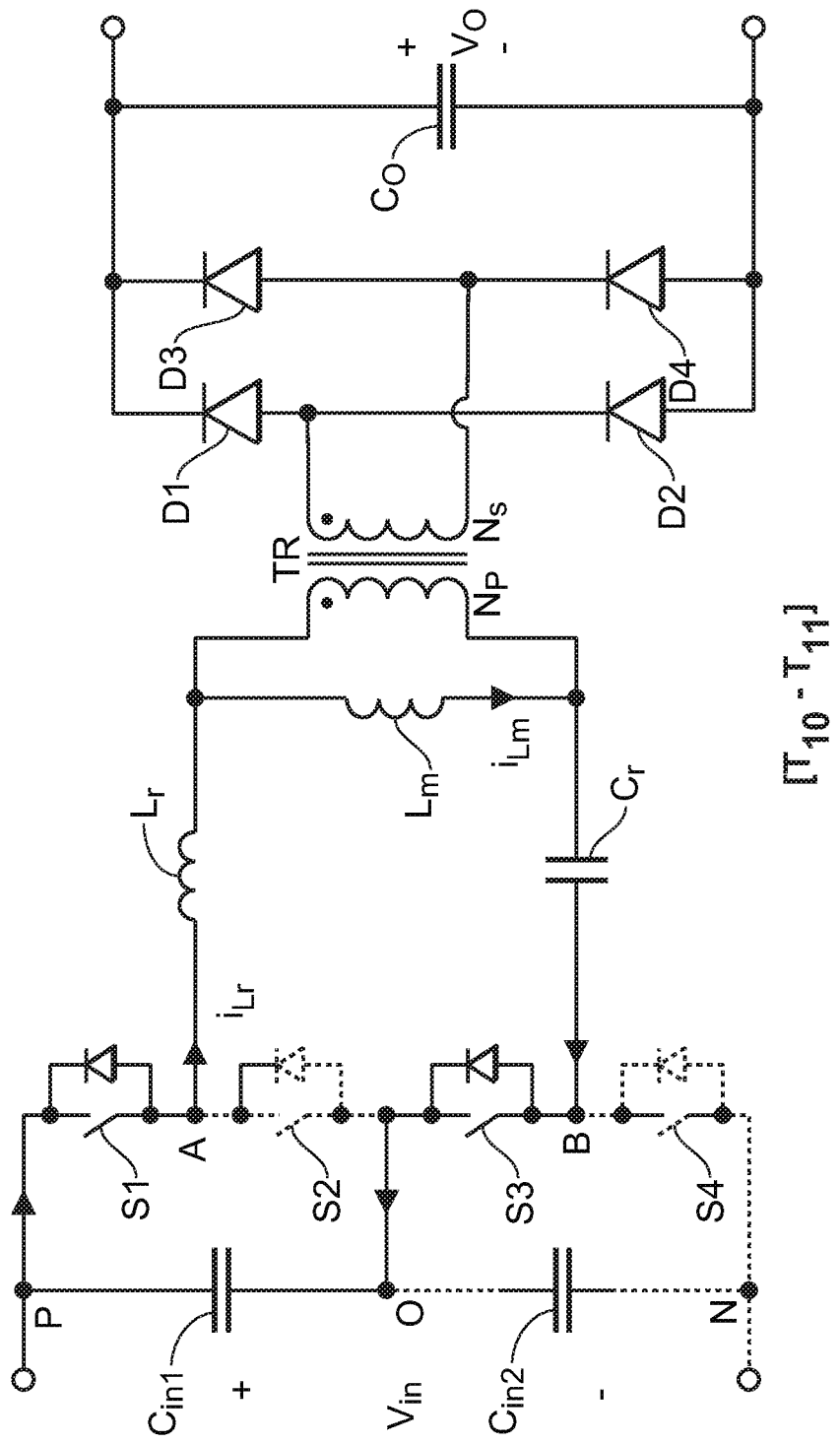
Figure 9I:
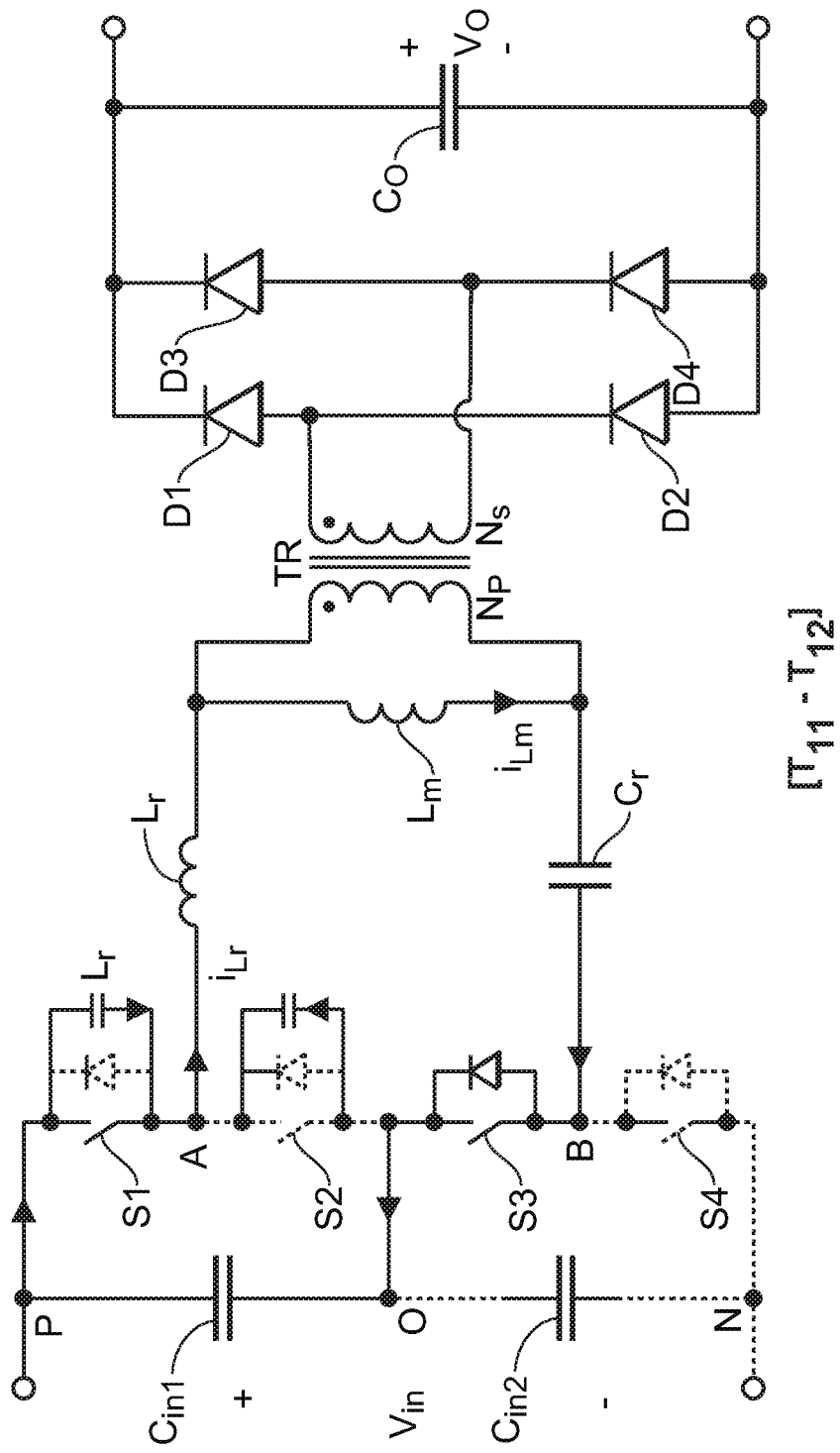
Figure 9M:
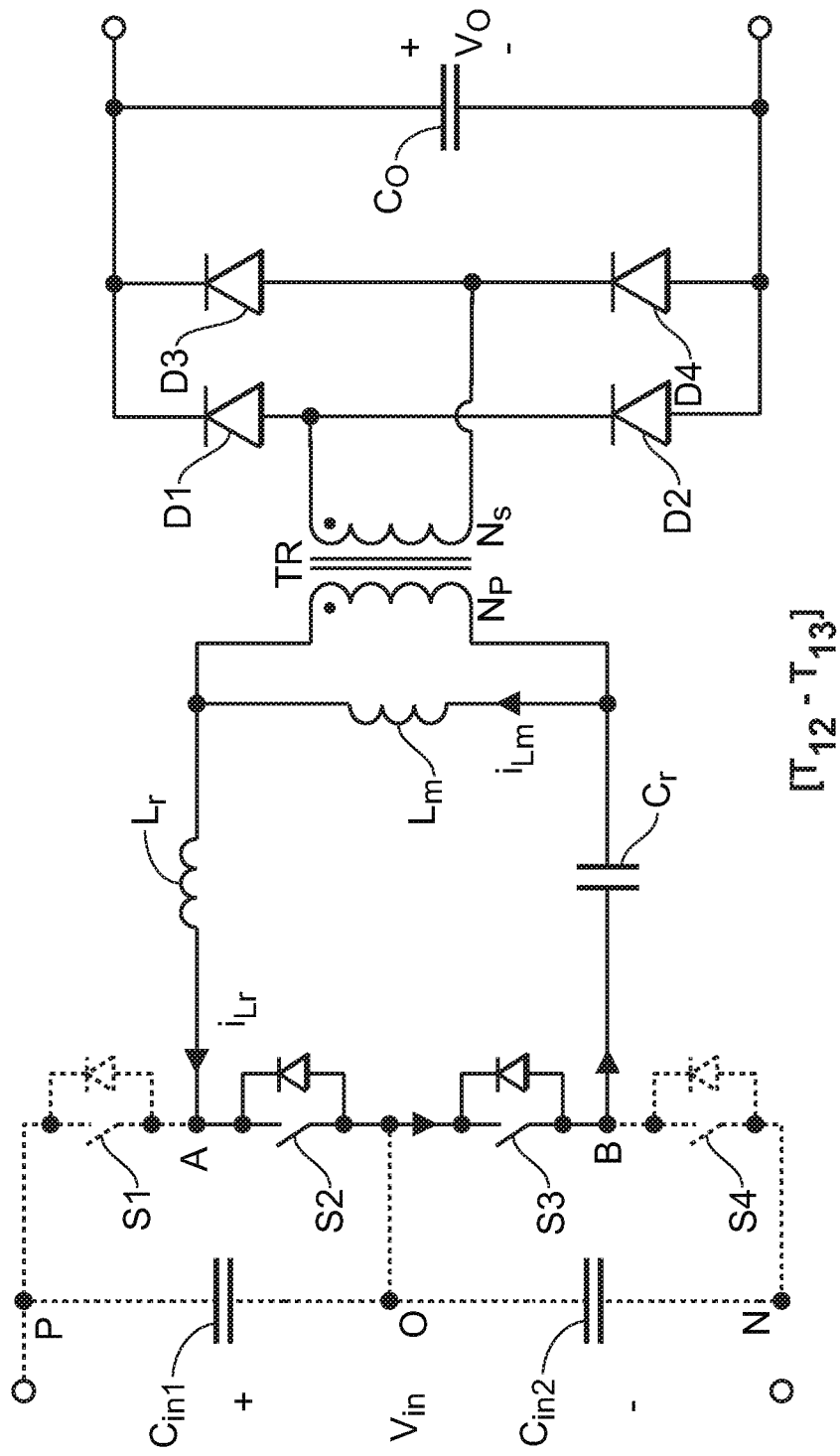
Figure 9N:
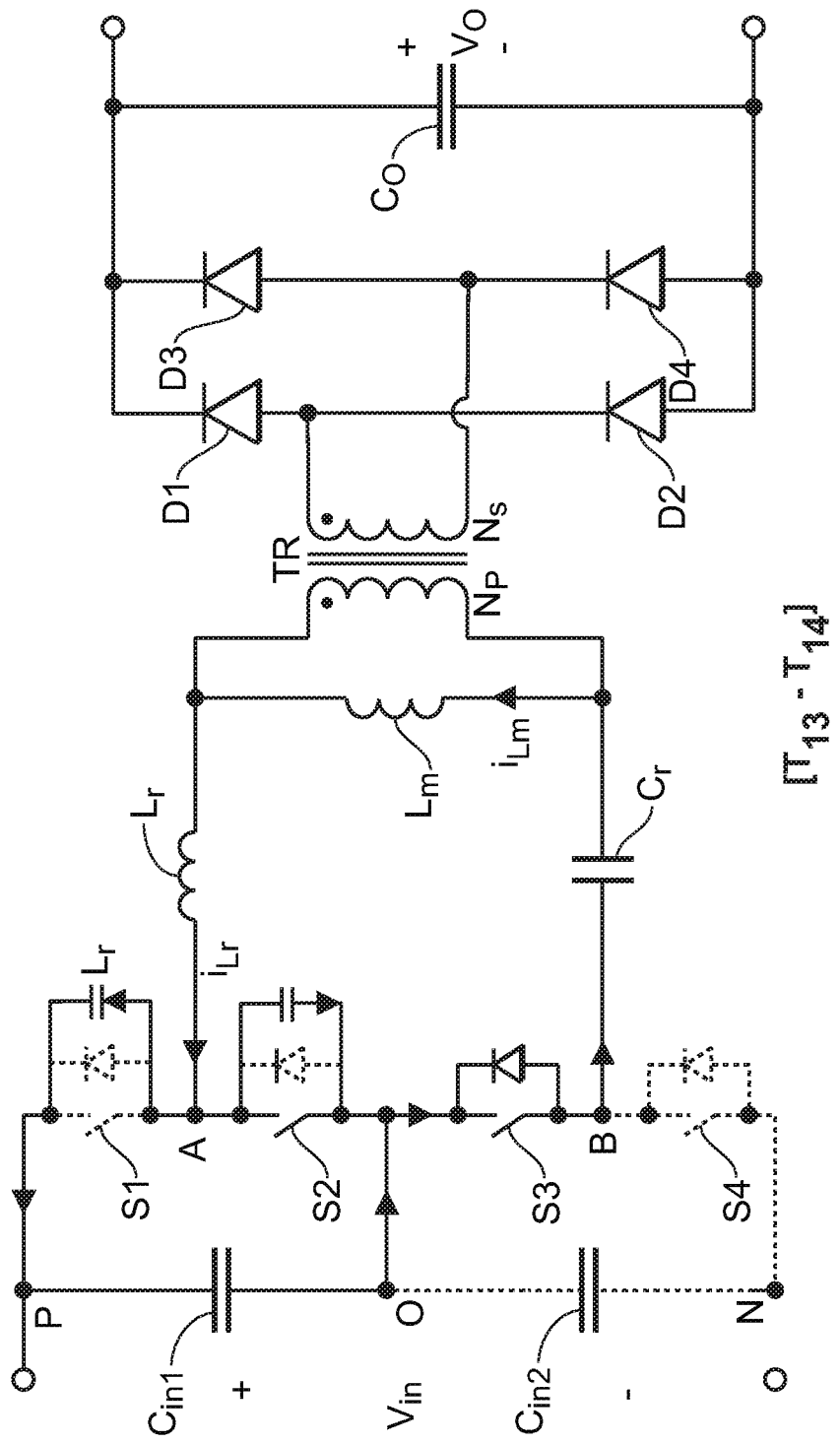
Figure 9O:
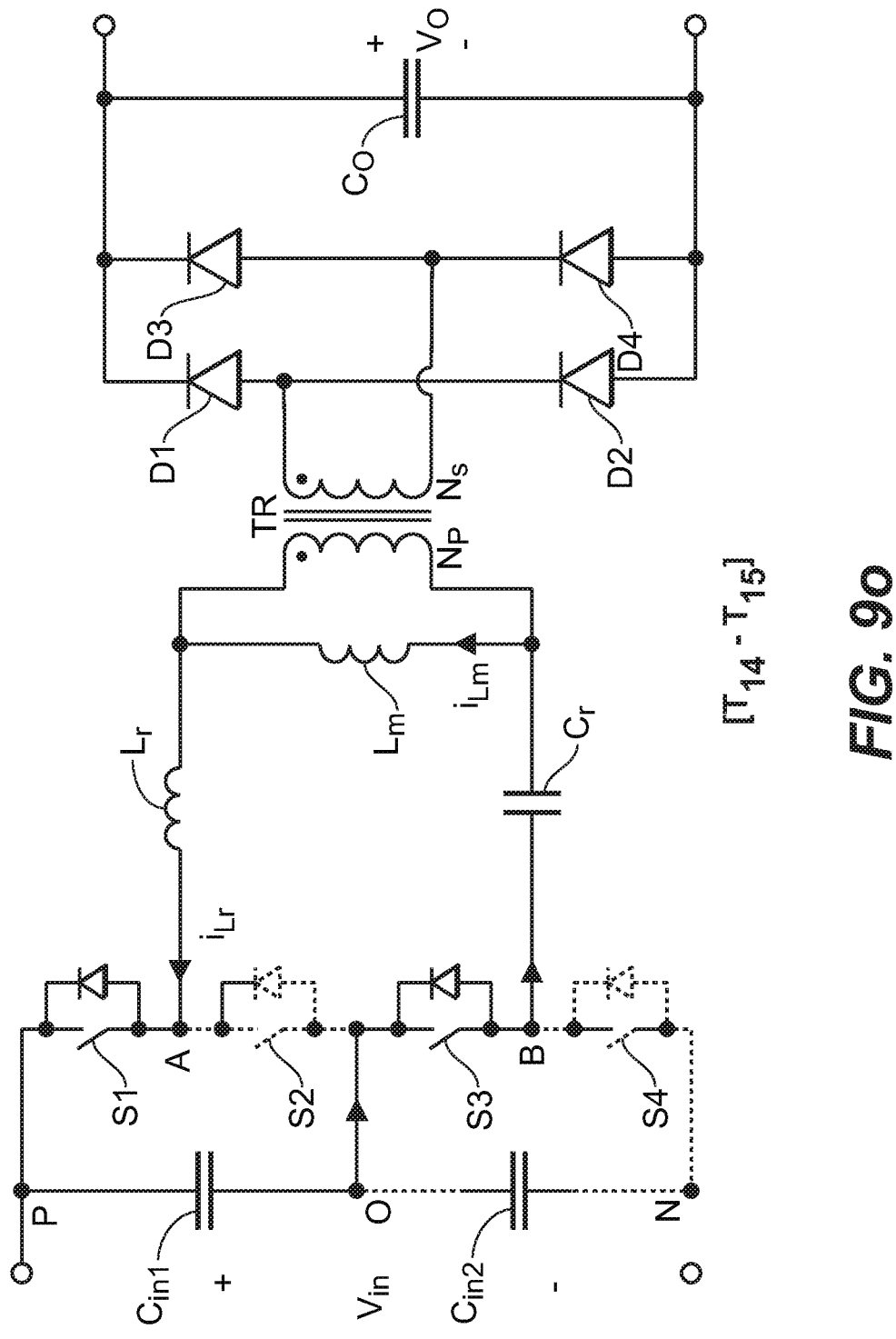
Figure 9P:
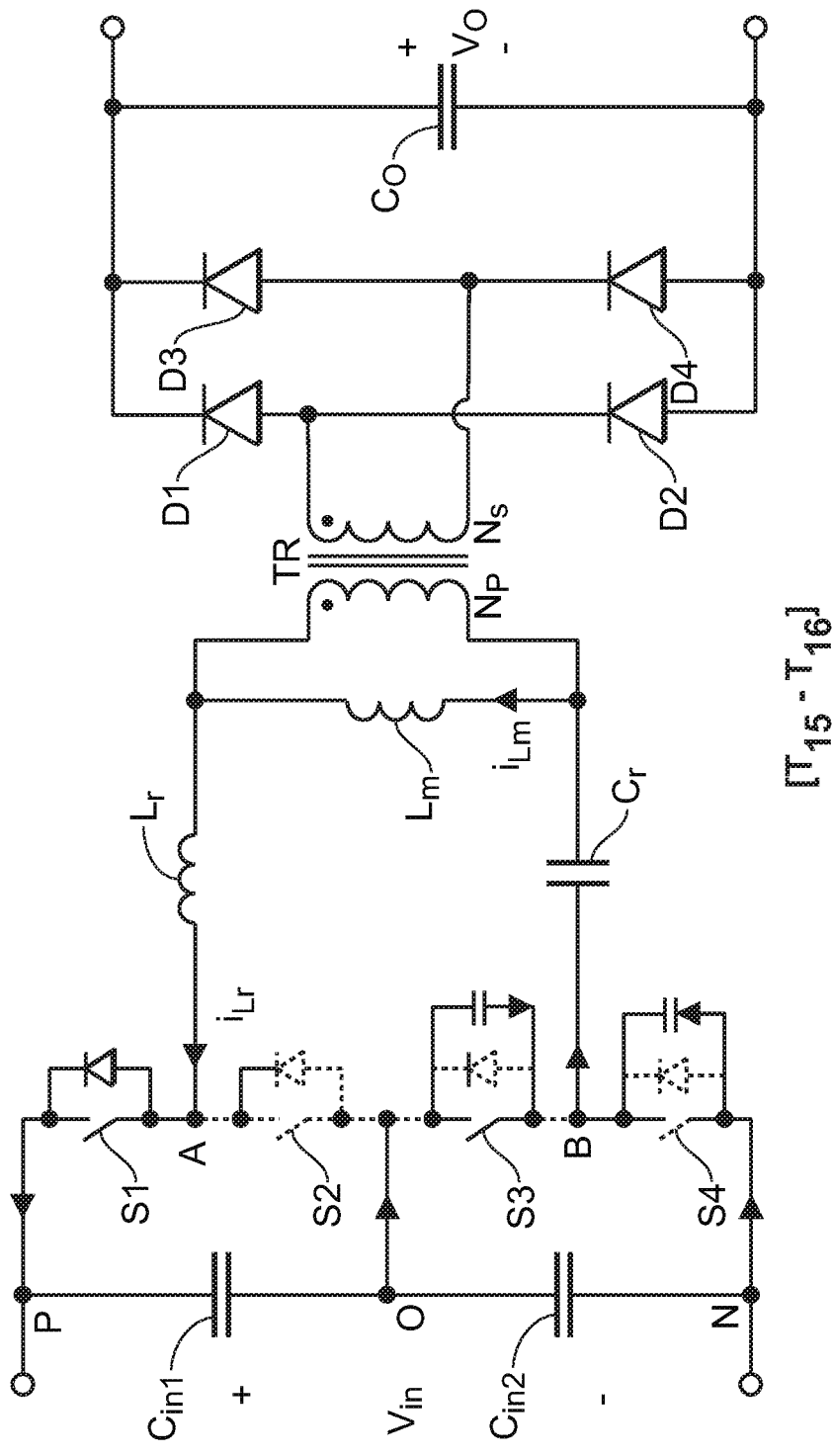

In conjunction with FIG. 8, FIGS. 9(a)-9(p) show sixteen operation stages of SHB LLC resonant converter 700 under the 3-level modulation scheme of the present invention, corresponding to time periods $(t_0, t_1)$, $(t_1, t_2)$, $(t_2, t_3)$, $(t_3, t_4)$, $(t_4, t_5)$, $(t_5, t_6)$, $(t_6, t_7)$, $(t_7, t_8)$, $(t_8, t_9)$, $(t_9, t_{10})$, $(t_{10}, t_{11})$, $(t_{11}, t_{12})$, $(t_{12}, t_{13})$, $(t_{13}, t_{14})$, $(t_{14}, t_{15})$, and $(t_{15}, t_{16})$, respectively. In FIGS. 9(a)-9(p), an open or "off" switch is indicated by dash-lines (e.g., in FIG. 9(a), primary switches $S_2$ and $S_3$ are open). Also, parasitic capacitors of primary switches $S_1$, $S_2$, $S_3$ and $S_4$ are represented by capacitors $C_{S1}$, $C_{S2}$, $C_{S3}$ and $C_{S4}$, respectively.

During time period ($t_0$, $t_1$), as shown in FIG. 9(a), resonant current $I_{Lr}$ increases and flows in resonant inductor $L_r$, transformer TR, magnetizing inductor $L_m$, resonant capacitor $C_r$, and primary switches $S_1$ and $S_4$. Phase-leg output voltage $V_{AB}$ equals input voltage $V_{in}$.

During time period ($t_1$, $t_2$), as shown in FIG. 9(b), capacitor $C_{S1}$ charges to ½ $V_{in}$ and capacitor $C_{S2}$ completely discharges (i.e., to zero volts across), after primary switch $S_1$ becomes open. Current $I_{Lr}$ begins to decrease. Phase-leg output voltage $V_{AB}$ falls to ½ $V_{in}$, as a result of the charging and discharging in capacitors $C_{S1}$ and $C_{S2}$.

During time period ($t_2$, $t_3$), as shown in FIG. 9(c), primary switch $S_2$ turns on at zero volts (i.e., at "ZVS" condition, with no switching loss). Phase-leg output voltage $V_{AB}$ remains at ½$V_{in}$ and current $I_{Lr}$ continues to decrease.

During time period ($t_3$, $t_4$), as shown in FIG. 9(d), capacitor $C_{S4}$ charges to ½$V_{in}$ and capacitor $C_{S3}$ discharges completely, after primary switch $S_4$ is turned off. Phase-leg output voltage $V_{AB}$ goes to zero volts, as a result of the charging and discharging in capacitors $C_{S4}$ and $C_{S3}$. Current $I_L$ continues to decrease.

During time period ($t_4$, $t_5$), as shown in FIG. 9(e), primary switch $S_3$ turns on at ZVS condition. Phase-leg output voltage $V_{AB}$ remains at zero volts and current $I_{Lr}$ continues to decrease.

During time period ($t_5$, $t_6$), as shown in FIG. 9(f), capacitor $C_{S3}$ charges to ½ $V_{in}$ and capacitor $C_{S4}$ discharges completely, after primary $S_3$ is turned off. Phase-leg output voltage $V_{AB}$ rises to ½ $V_{in}$ and current $I_{Lr}$ begins to increase, as a result of the charging and discharging in capacitors $C_{S3}$ and $C_{S4}$.

During time period ($t_6$, $t_7$), as shown in FIG. 9(g), primary switch $S_4$ turns on at ZVS condition. Phase-leg output voltage $V_{AB}$ remains at ½$V_{in}$ and current $I_{Lr}$ continues to increase.

During time period ($t_7$, $t_8$), as shown in FIG. 9(h), capacitor $C_{S2}$ charges to ½ $V_{in}$ and capacitor $C_{S1}$ discharges completely, after primary switch $S_2$ is turned off. Phase-leg output voltage $V_{AB}$ becomes $V_{in}$, as a result of the charging and discharging in capacitors $C_{S2}$ and $C_{S1}$. Current $I_{Lr}$ continues to increase.

During time period ($t_8$, $t_9$), as shown in FIG. 9(i), primary switch $S_1$ turns on at ZVS condition. Phase-leg output voltage $V_{AB}$ remains at ½$V_{in}$ and current $I_{Lr}$ continues to increase.

During time period ($t_9$, $t_{10}$), as shown in FIG. 9(j), capacitor $C_{S4}$ charges to ½ $V_{in}$ and capacitor $C_{S3}$ completely discharges, after primary switch $S_4$ becomes open. Current $I_L$ begins to decrease. Phase-leg output voltage $V_{AB}$ falls to ½ $V_{in}$, as a result of the charging and discharging in capacitors $C_{S4}$ and $C_{S3}$.

During time period ($t_{10}$, $t_{11}$), as shown in FIG. 9(k), primary switch $S_3$ turns on at ZVS condition. Phase-leg output voltage $V_{AB}$ remains at ½$V_{in}$ and current $I_{Lr}$ continues to decrease.

During time period ($t_{11}$, $t_{12}$), as shown in FIG. 9(l), capacitor $C_{S1}$ charges to ½$V_{in}$ and capacitor $C_{S2}$ discharges completely, after primary switch $S_1$ is turned off. Phase-leg output voltage $V_{AB}$ goes to zero volts, as a result of the charging and discharging in capacitors $C_{S1}$ and $C_{S2}$. Current $I_{Lr}$ continues to decrease.

During time period ($t_{12}$, $t_{13}$), as shown in FIG. 9(m), primary switch $S_2$ turns on at ZVS condition. Phase-leg output voltage $V_{AB}$ remains at zero volts and current $I_{Lr}$ continues to decrease.

During time period ($t_3$, $t_4$), as shown in FIG. 9(n), capacitor $C_{S2}$ charges to ½ $V_{in}$ and capacitor $C_{S1}$ discharges completely, after primary $S_2$ is turned off. Phase-leg output voltage $V_{AB}$ rises to ½ $V_{in}$ and current $I_{Lr}$ begins to increase, as a result of the charging and discharging in capacitors $C_{S2}$ and $C_{S1}$.

During time period ($t_{14}$, $t_{15}$), as shown in FIG. 9(o), primary switch $S_1$ turns on at ZVS condition. Phase-leg output voltage $V_{AB}$ remains at ½$V_{in}$ and current $I_{Lr}$ continues to increase.

During time period ($t_{15}$, $t_{16}$), as shown in FIG. 9(p), capacitor $C_{S3}$ charges to ½ $V_{in}$ and capacitor $C_{S4}$ discharges completely, after primary switch $S_3$ is turned off. Phase-leg output voltage $V_{AB}$ becomes $V_{in}$, as a result of the charging and discharging in capacitors $C_{S3}$ and $C_{S4}$. Current $I_{Lr}$ continues to increase.

As all the primary switches turn on at ZVS conditions, the 3-level modulation scheme of the present invention significantly reduce total switching loss.

4. Advantages of the Three-Level Modulation Scheme of the Present Invention

A. Reducing Output Voltage

The three-level modulation scheme of the present invention generates, across the series-connected $L_r$-$C_r$-$L_m$ resonant circuit, controllable phase-leg output voltage $V_{AB}$, which includes DC and AC components. In this embodiment, during LLC resonant converter operations, resonant capacitor $C_r$ blocks the DC component, so that only the AC component appears across the primary-side windings of transformer TR. When device switching frequency $f_{sw}$ equals resonant frequency $$f_r = \frac{\sqrt{L_r C_r}}{2\pi}$$

and when duration φ=0, output voltage $V_O$ equals the average of the product of the rectified AC component of phase-leg output voltage $V_{AB}$ and transformer TR's voltage gain. As transformer TR's voltage gain is the turns ratio $$\frac{N_P}{N_S},$$

where $N_S$ and $N_P$ are the numbers of turns in the secondary-side winding and the primary-winding, respectively, output voltage $V_O$ is given by:

$$V_O = \frac{N_P \overline{V_{AB\_ac}}}{N_S},$$

where $\overline{V_{AB\_ac}}$ is the average of the rectified AC component of phase-leg output voltage $V_{AB}$. For a desired value of duration φ, the average voltage of the rectified AC component reduces, if switching frequency $f_r$ is fixed. Accordingly, output voltage $V_O$ also decreases. Thus, the three-level modulation scheme of the present invention can be used to regulate output voltage $V_O$ without affecting switching frequency $f_r$.

B. Balancing the Current Stress in Each Primary Switch

Figure 10:
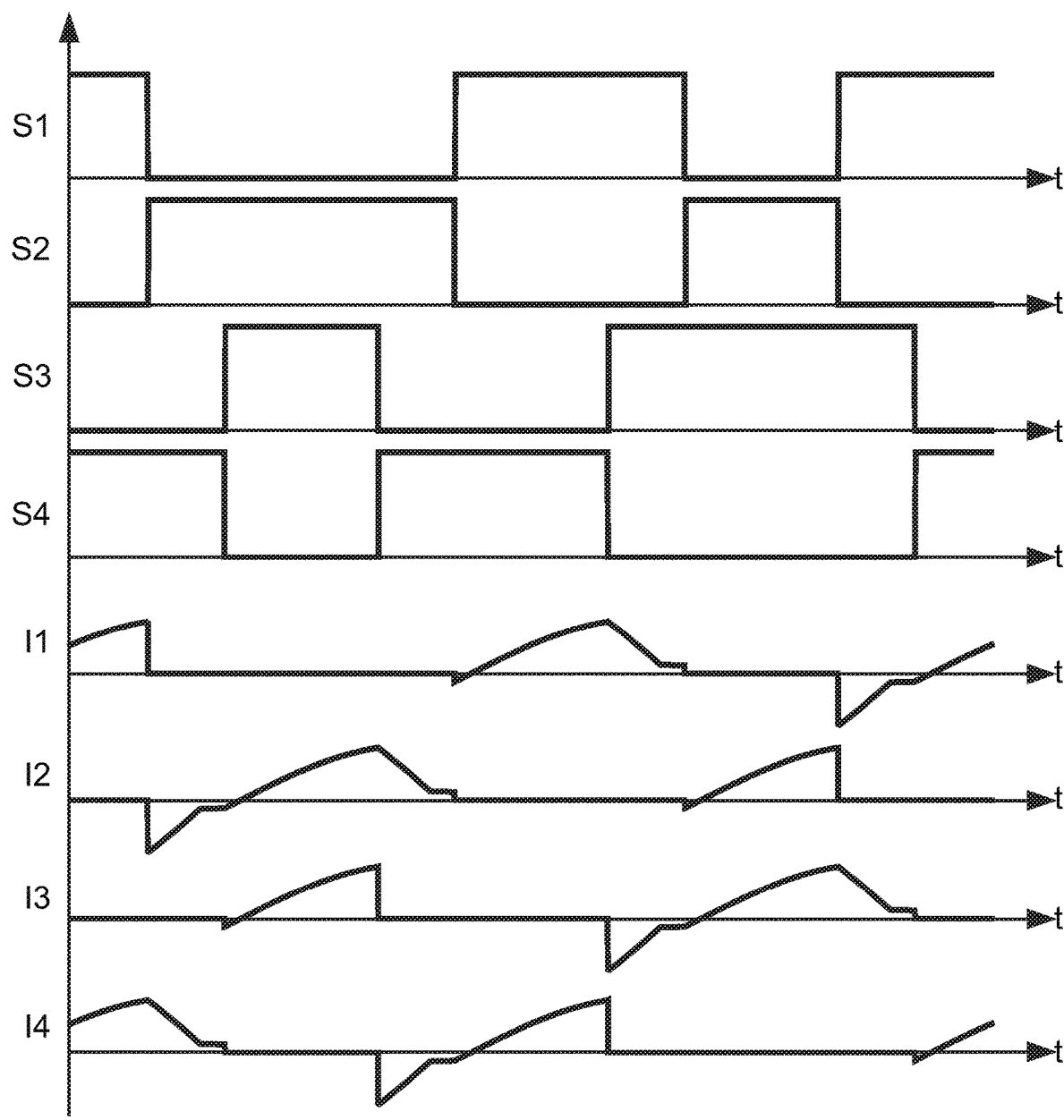
FIG. 10 shows control switch voltages $S_1$ to $S_4$ in primary switches $S_1$ to $S_4$, and the contemporaneous currents $I_1$ to $I_4$ flowing through them during switching period $T_{sw}$, under the three-level modulation scheme of the present invention, without accounting for the effects of any dead-time.

The "on"-resistance of a power device gives rise to a conduction loss. In SHB LLC resonant converter 700 of FIG. 7(*a*), primary switches $S_1$ to $S_4$ incur conduction loss when they are conducting. FIG. 10 shows control switch voltages $S_1$ to $S_4$ in primary switches $S_1$ to $S_4$, and the contemporaneous currents $I_1$ to $I_4$ flowing through them during switching period $T_{sw}$, under the three-level modulation scheme of the present invention, without accounting for the effects of any dead-time. Currents $I_1$ to $I_4$ have the same root-mean-square (RMS) value, thereby balancing the thermal stress equally among the primary switches. Consequently, longer life in these devices may be expected, increasing the reliability of SHB LLC resonant converter 700.

5. DC-Link Capacitor Voltage Balancing

Ideally, when the top and bottom capacitors (e.g., capacitors $C_{in1}$ and $C_{in2}$) deliver the same power to the resonant tank under the three-level modulation scheme of the embodiment of the present invention, their DC-link capacitor voltage is automatically balanced without any additional control. However, both the parameter mismatch of the equivalent series resistances (ESRs) and the capacitances of the DC-link capacitors and the timing mismatch of the switch control or gate signals are inevitable in any practical SHB LLC resonant converter. These mismatches result in DC-link capacitor voltage imbalances.

The present invention provides a method to balance the DC-link capacitor voltages and to keep the SHB LLC resonant converter operating in a safe range. When capacitor $C_{in1}$ has a greater voltage than capacitor $C_{in2}$, all transitions in the switch control signals to primary switches $S_1$ and $S_2$ are delayed by a short time period and all transitions in the switch control signals to primary switches $S_3$ and $S_4$ are brought forward by the same amount. Similarly, when capacitor $C_{in2}$ has a greater voltage than capacitor $C_{in1}$, all transitions in the switch control signals to primary switches $S_1$ and $S_2$ are brought forward by a short time period and all transitions in the switch control signals to primary switches $S_3$ and $S_4$ are delayed by the same amount. The short time period adjustment preferably should not exceed 5% of the switching period $T_{sw}$ to avoid any adverse effect on the normal operations of the SHB LLC resonant converter.

6. Achieving a Wide Output Voltage Range Operation by Combining Pulse Frequency Modulation (PFM) with the Three-Level Modulation Scheme As mentioned above, maximum efficiency is achieved when the SHB LLC resonant converter is operated at an operating point at or very close to resonant frequency $f_r$. To achieve a wide output voltage range, conventional control modulates switching frequency $f_{sw}$ to adjust the DC voltage gain. However, switching frequency control moves the operating point away from maximum circuit efficiency. Further, for a very wide output voltage range, even such switching frequency control is unable to achieve the required DC voltage gain due to the fixed circuit parameters.

Figure 11:
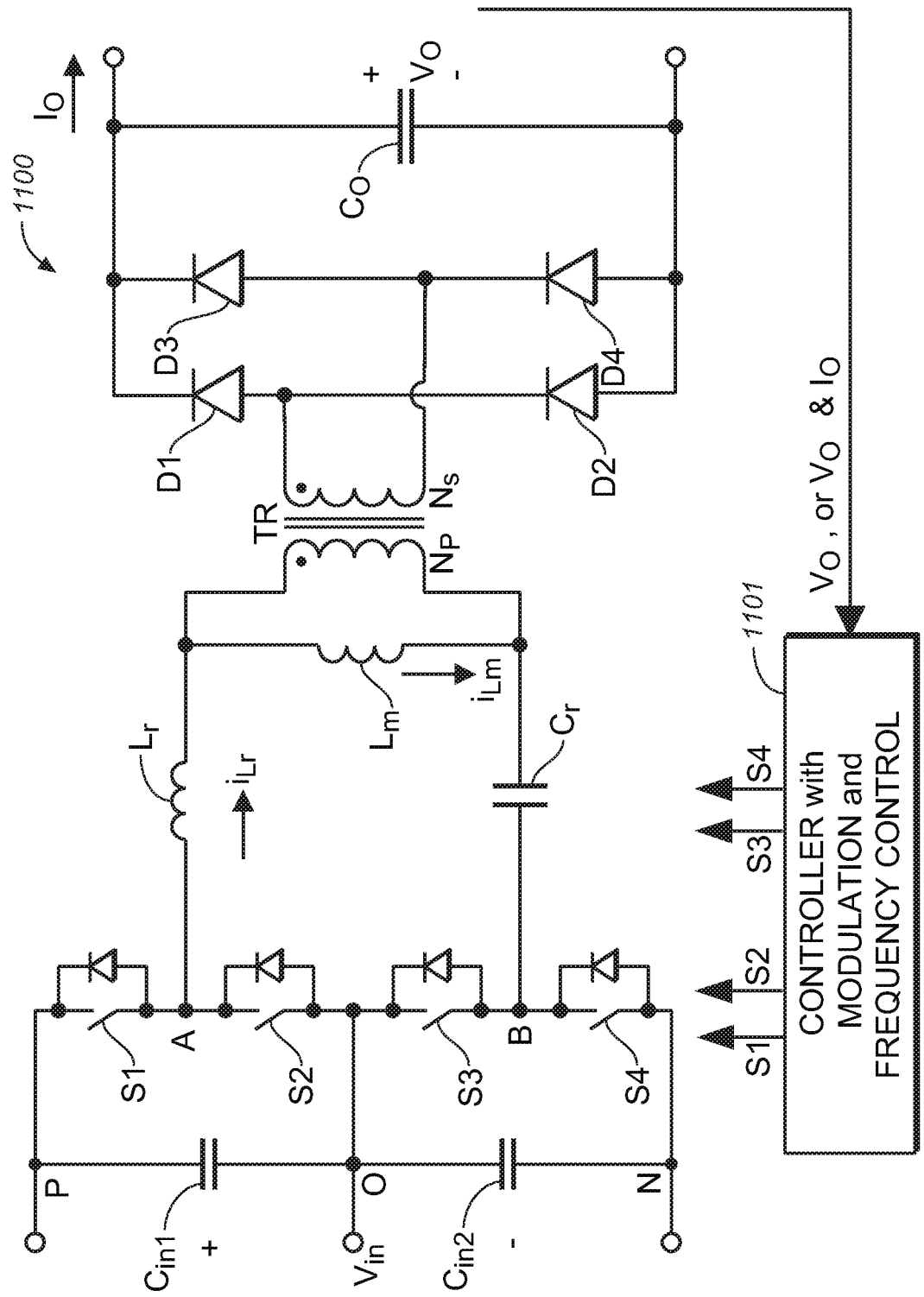
FIG. 11 is a schematic diagram showing SHB LLC resonant converter 1100, which includes control circuit 1101 that generates switch control signals to primary switches $S_1$ to $S_4$ based on output voltage $V_o$ (and, optionally, output current $I_o$), according to one embodiment of the present invention.

The inventors of the present invention recognize that an SHB LLC resonant converter can provide a wide output voltage range, while efficiently achieving desirable different DC voltage gains at or near the resonant frequency (i.e., a narrower input switching frequency range), using a combination of different modulation schemes. Moreover, the three-level modulation scheme of the present invention achieves the wide output voltage range and the circuit gains even when the circuit parameter values are fixed. FIG. 11 is a schematic diagram showing SHB LLC resonant converter 1100, which includes control circuit 1101 that generates switch control signals to primary switches $S_1$ to $S_4$ based on output voltage $V_o$ (and, optionally, output current $I_o$), according to one embodiment of the present invention.

Control circuit 1101 in SHB LLC resonant converter 1100 may use output voltage $V_O$ as its main control target. Output current $I_O$ may also be used as either a separate control target or as a feedback signal representative of a load condition. A reference value representative of each control target may be generated internally in control circuit 1101 or from an external source. Based on a difference between the sensed voltage $V_o$ (or the sensed current $I_o$) and the corresponding reference value, control circuit 1101 switches among two or more modulation schemes that operate switches $S_1$ to $S_4$ on the primary-side phase leg of SHB LLC resonant controller 1101. One or more of the control targets may be used to determine values of other control parameters, such as switching frequency $f_{sw}$ and duty cycles of signals in the selected modulation scheme. The signals that operate primary-side switches $S_1$ to $S_4$ are generated based on the selected modulation scheme and other control parameter values.

The conventional symmetrical frequency modulation scheme provides a desired output voltage gain by varying the switching frequency $f_{sw}$ about resonant frequency $f_r$. While the proposed three-level modulation scheme provides extra output voltage gains at the maximum allowable switching frequency by controlling the durations the primary switches are conducting. Accordingly, the present invention provides a control method that combines a selected modulation scheme and frequency control to achieve a predetermined output voltage range. (The modulation schemes may overlap in their respective output voltage regulation ranges.) Modulation scheme selection under the present invention may be based, for example, on control parameters such as voltage control targets, load conditions, and an allowable operating frequency range.

Figure 12A:
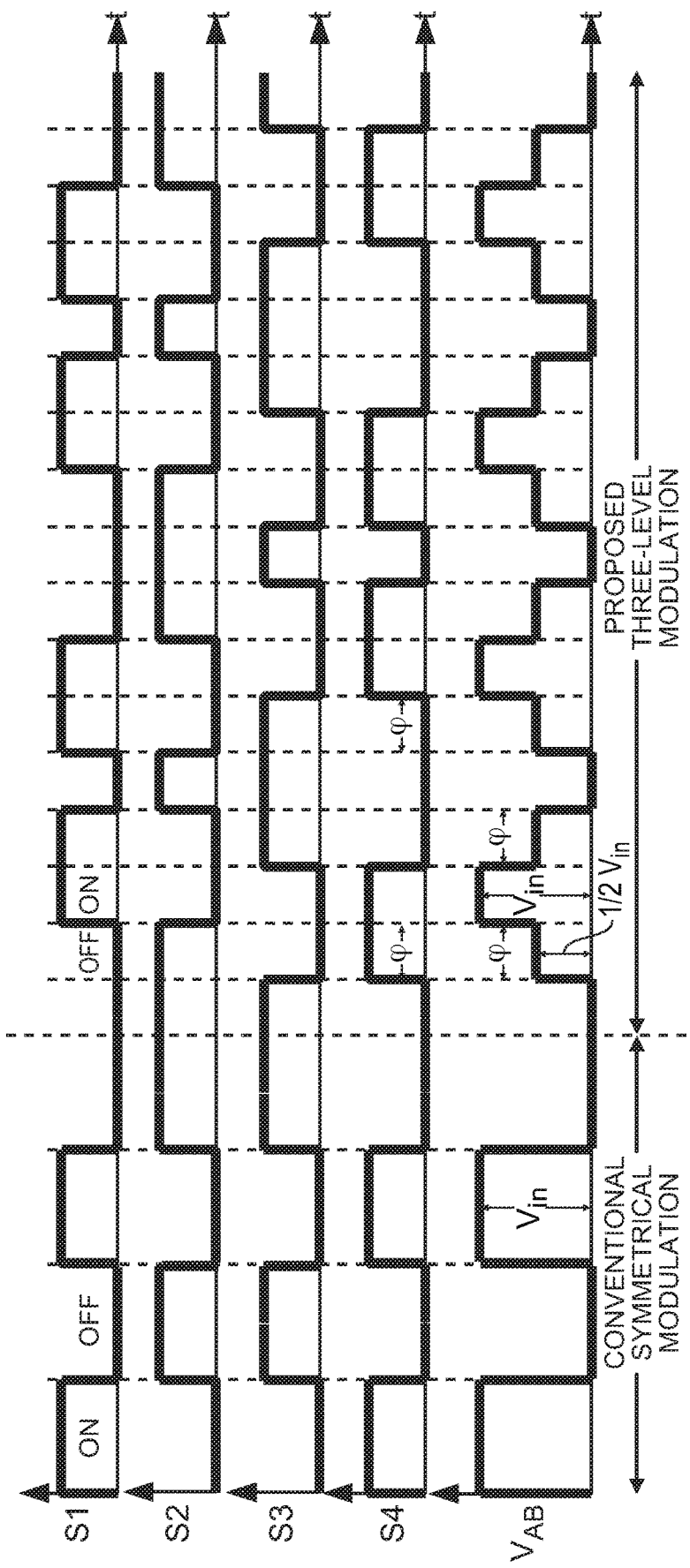
FIG. 12(a) illustrates control signals for primary switches $S_1$ to $S_4$ and phase-leg output voltage $V_{AB}$, as the control scheme switches from a symmetrical modulation scheme to a three-level modulation scheme.
Figure 12B:
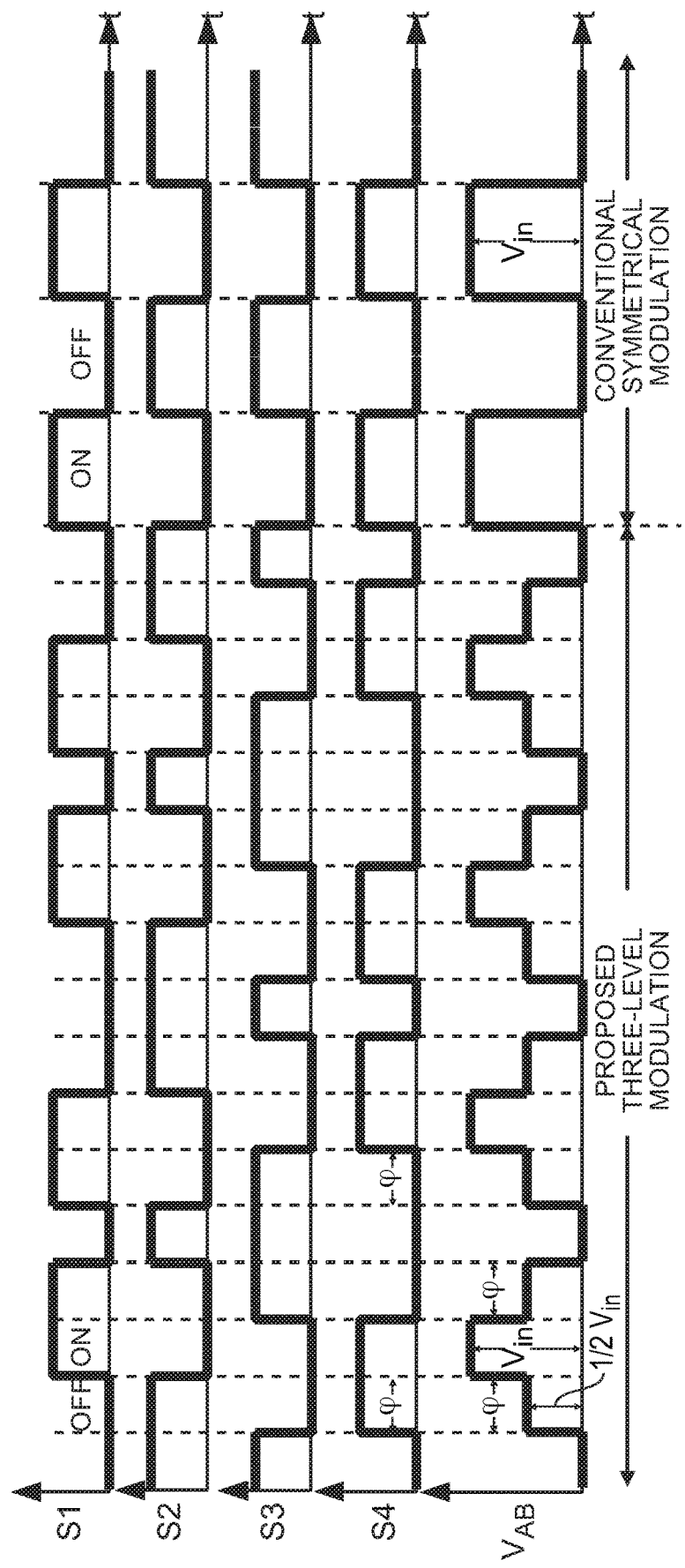
FIG. 12(b) illustrates control signals for primary switches $S_1$ to $S_4$ and phase-leg output voltage $V_{AB}$, as the control scheme switches from a three-level modulation scheme to a symmetrical modulation scheme, according to one embodiment of the present invention.

FIG. 12(*a*) illustrates, in SHB LLC resonant converter 700, control signals for primary switches $S_1$ to $S_4$ and phase-leg output voltage $V_{AB}$, as the control scheme switches from a symmetrical modulation scheme to a three-level modulation scheme. FIG. 12(*b*) illustrates, in SHB LLC resonant converter 700, control signals for primary switches $S_1$ to $S_4$ and phase-leg output voltage $V_{AB}$, as the control scheme switches from a three-level modulation scheme to a symmetrical modulation scheme, according to one embodiment of the present invention. As shown in FIG. 12(*a*), switching from a symmetrical modulation scheme (interval 1201) to the three-level modulation scheme (interval 1292) of the present invention requires no transition period, as the control target for phase-leg output voltage $V_{AB}$ changes from a high voltage to a low voltage in output voltage $V_O$. Likewise, as shown in FIG. 12(*b*), switching from the three-level modulation scheme of the present invention (interval 1203) to a symmetrical modulation scheme (interval 1204) also requires no transition period, as the control target for phase-leg output voltage $V_{AB}$ changes from a low voltage to a high voltage in output voltage $V_O$. In one embodiment, the symmetrical modulation scheme includes variable-frequency modulation. In another embodiment, the symmetrical modulation scheme includes constant-frequency modulation.

7. Extension for Other Topologies

Figure 13A:
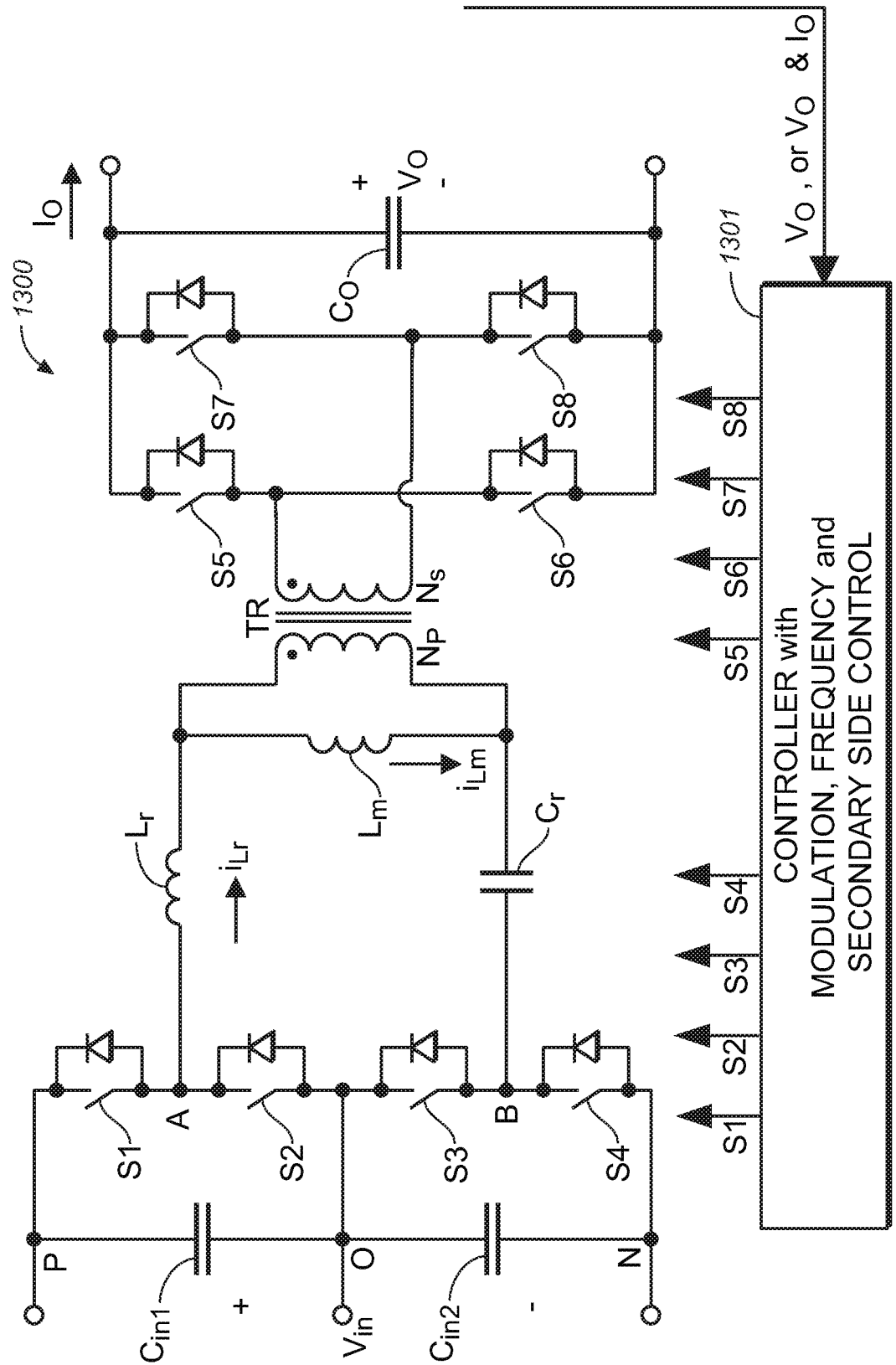
FIGS. 13(a) and 13(b) show, respectively, (i) SHB LLC resonant converter 1300 with a full-bridge synchronous rectifier on the secondary side, and (ii) SHB LLC resonant converter 1350 with center-tapped transformer TR and synchronous rectifiers $S_5$ and $S_6$ on the secondary side, according to one embodiment of the present invention.
Figure 13B:
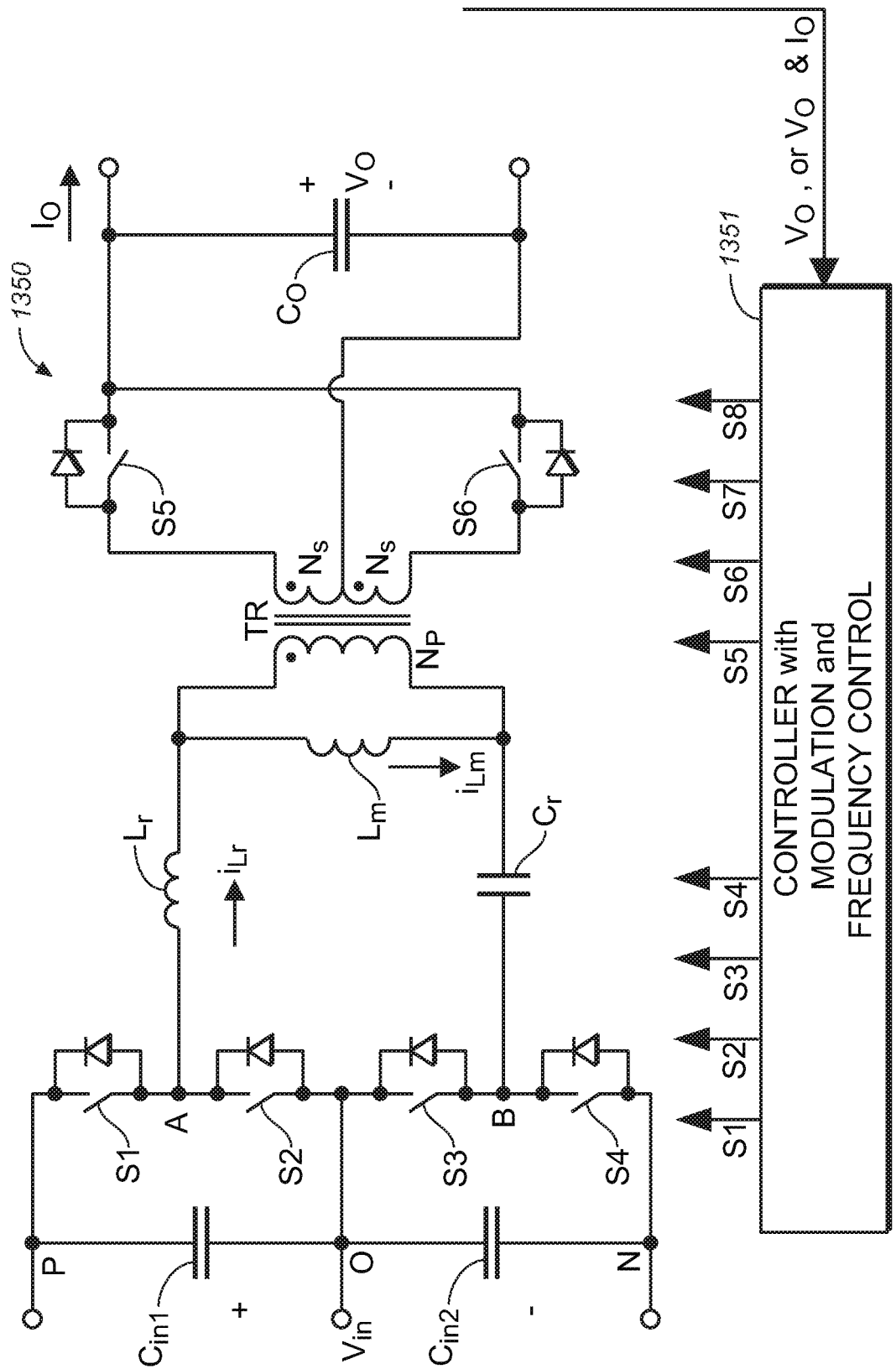

The present invention is equally applicable to SHB LLC resonant converters with other secondary-side topologies to provide a wide output voltage range with the same beneficial narrow device switching frequency. FIGS. 13(*a*) and 13(*b*) show, respectively, (i) SHB LLC resonant converter 1300 with a full-bridge synchronous rectifier on the secondary side, and (ii) SHB LLC resonant converter 1350 with center-tapped transformer TR and synchronous rectifiers $S_5$ and $S_6$ on the secondary side, according to one embodiment of the present invention. In one embodiment, the secondary winding of the transformer TR is center-tapped, and the secondary-side circuit includes first and second rectifiers connected in a half-bridge configuration. In SHB LLC resonant converter 1300, control circuit 1301 may combine the methods discussed with respect to FIG. 7(*b*) above with conventional secondary-side control schemes to generate the signals to operate primary-side switches $S_1$ to $S_4$ and secondary-side switches $S_5$ to $S_8$. In SHB LLC resonant converter 1350, control circuit 1351 may combine the methods discussed with respect to FIG. 7(*b*) above with conventional secondary-side control schemes to generate the signals to operate primary-side switches $S_1$ to $S_4$ and secondary-side switches $S_5$ and $S_6$. The present invention is equally applicable to a SHB LLC resonant converter resulting from replacing secondary-side switches $S_5$ to $S_8$ of SHB LLC resonant converter 1300, or secondary-side switches $S_5$ to $S_6$ of SHB LLC resonant converter 1350, by diodes.

Figure 14A:
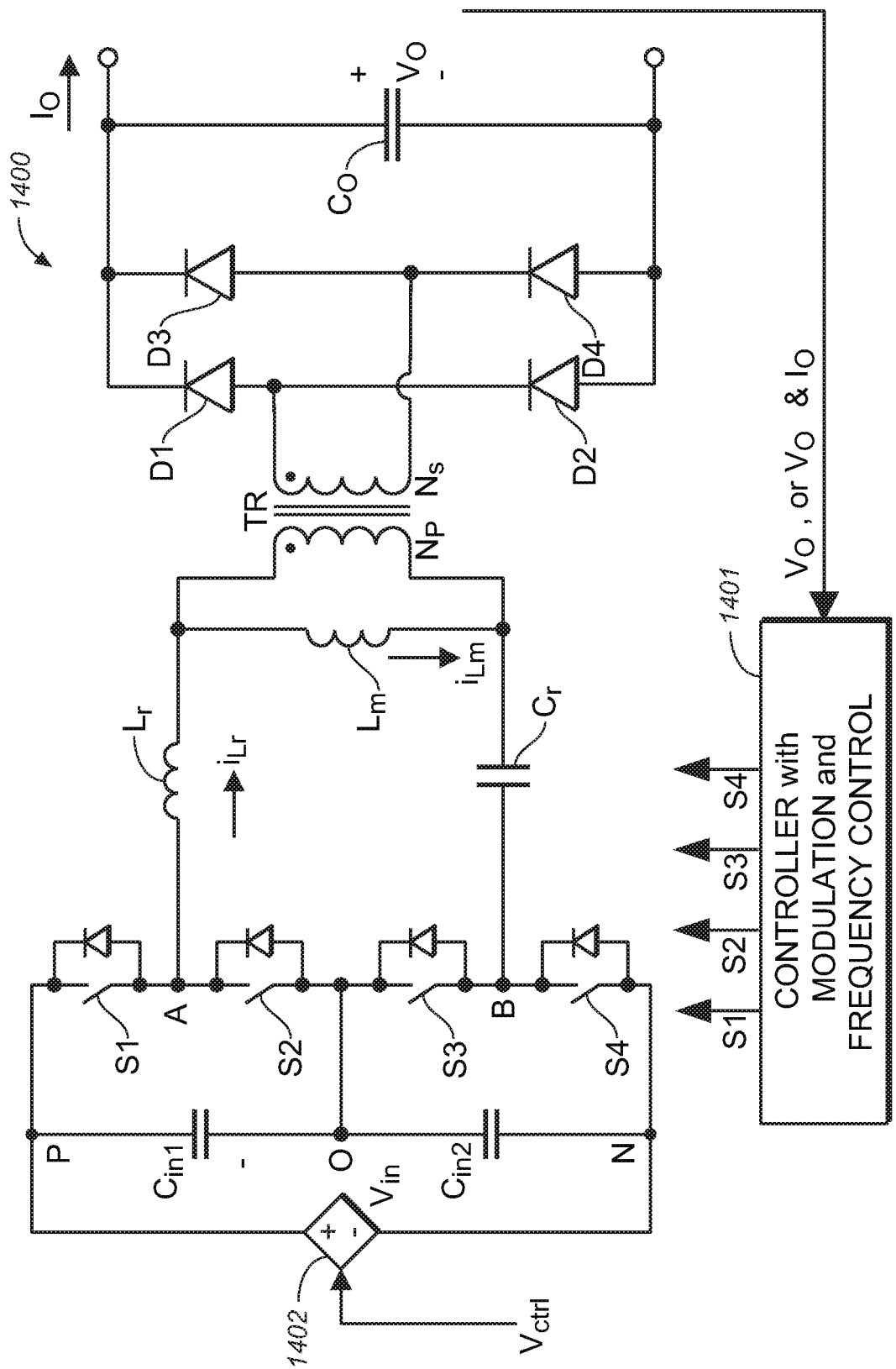
FIGS. 14(a), and 14(b) show, respectively, (i) SHB LLC resonant converter 1400 with variable DC input voltage source 1402, and (i) SHB LLC resonant converter 1450 with DC input voltages $V_{in1}$ and $V_{in2}$, respectively, controlled by a method in one embodiment of the present invention.
Figure 14B:
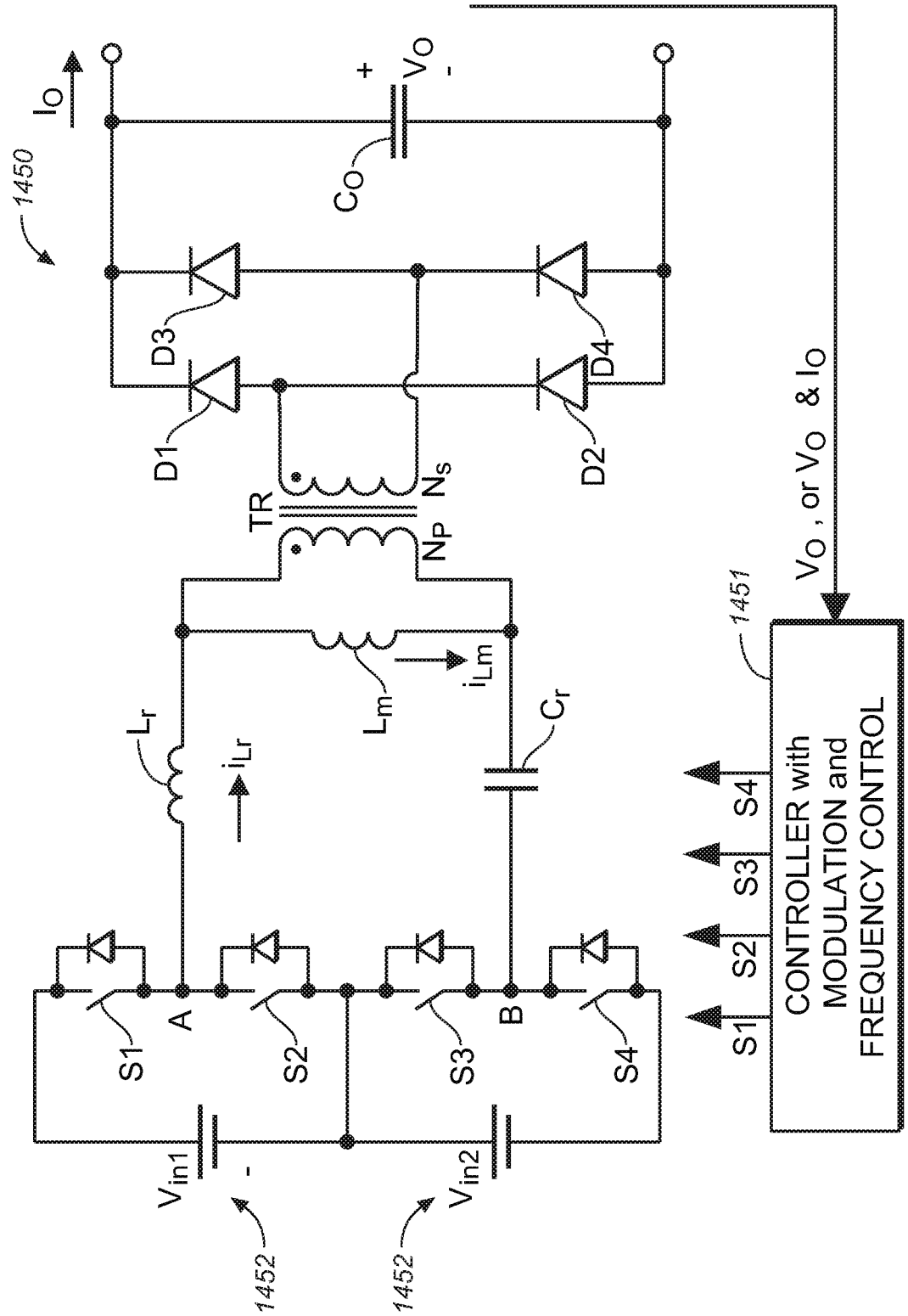

The present invention is also applicable to SHB LLC resonant converters with a variable DC input voltage, or with two different input voltages, such as shown in FIGS. 14(*a*) and 14(*b*), respectively. FIGS. 14(*a*), and 14(*b*) show, respectively, (i) SHB LLC resonant converter 1400 with variable DC input voltage source 1402, and (i) SHB LLC resonant converter 1450 with DC input voltages $V_{in1}$ and $V_{in2}$, respectively, controlled by a method of the present invention. As shown in FIG. 14(*a*), variable DC input voltage source 1402 may be controlled by signal $V_{ctrl}$, which may be internally generated or externally provided. Combining a control method for signal $V_{ctrl}$ with any of the methods of the present invention discussed above may further extend the output voltage range or further reduce the device switching frequency range of SHB LLC resonant converter 1400.

The above detailed description is provided to illustrate specific embodiments of the present invention and is not intended to be limiting. Numerous variations and modifications within the scope of the present invention are possible. The present invention is set forth in the accompanying claims.

We claim:

1. A power converter having first and second input terminals to receive an input signal from a voltage source to provide an output voltage or an output current to at least one load, comprising:
    (a) a transformer having primary and secondary windings;
    (b) a primary-side circuit, comprising:
        (i) first, second, third, and fourth series-connected switching devices connected across the first and second input terminals, the first and second switching devices being controlled by first and second switch control signals, respectively, and the third and the fourth switching devices being controlled by a third and a fourth complementary switch control signals, respectively; and
        (ii) a resonant tank circuit, the resonant circuit being coupled (1) between a first electrical node, being a common electrical node between the first and second switching devices, and a second electrical node, being a common electrical node between the third and fourth switching devices; and (2) to the primary winding of the transformer;
    (c) a secondary-side circuit coupled to the secondary winding of the transformer, the secondary-side circuit comprising a filter capacitor providing the output voltage or output current to the load; and
    (d) a control circuit that, based on the output voltage or the output current, is configurable to generate the first, second, third, and fourth switch control signals according to a first modulation scheme in which (i) the first and the second switch control signals are substantially complementary with each other and the third and the fourth switch control signals are substantially complementary with each other, (ii) the first, second, third, and fourth switch control signals are periodic with a common switching period, (iii) within the common switching period, (1) each switch control signal has two rising edges and two falling edges; and either (2) the first rising edge of the first switch control signal lags the first rising edge of the fourth switch control signal by a first predetermined time, while the second rising edge of the first switch control signal leads the second rising edge for the fourth switch control signal by a second predetermined time, or (3) the first rising edge of the first switch control signal leads the first rising edge of the fourth switch control signal by a first predetermined time, while the second rising edge of the first switch control signal lags the second rising edge for the fourth switch control signal by a second predetermined time, and (iv) the control circuit varies the switching period, the first predetermined time, and the second predetermined time.

2. The power converter of claim 1, wherein the resonant tank circuit includes one or more resonant capacitors and one or more resonant inductors.

3. The power converter of claim 1, wherein the first predetermined time and the second predetermined time are equal.

4. The power converter of claim 1, wherein each switching device is conducting substantially 50% of each switching period.

5. The power converter of claim 4, wherein the control circuit decreases the output voltage, the output power, or both, by increasing the first predetermined time.

6. The power converter of claim 4, wherein the control circuit increases the output voltage, the output power or both by decreasing the first predetermined time.

7. The power converter of claim 1, wherein each of the first, second, third, and fourth switching devices becomes conducting under a zero-voltage switching (ZVS) condition.

8. The power converter of claim 1, wherein the control circuit varies the switching period about substantially one cycle of a resonant frequency of the resonant tank circuit.

9. The power converter of claim 1, further comprising a first input capacitor coupled across the first and second switching devices and a second input capacitor coupled across the third and fourth switching devices; wherein, when the first input capacitor has a voltage greater than that of the second input capacitor, the control circuit delays transitions in the first and second switch control signals and brings forward in time transitions of the third and fourth switch control signals.

10. The power converter of claim 9, wherein the control circuit delays transitions in the first and second switch control signals and brings forward in time transitions of the third and fourth switch control signals by the same amount.

11. The power converter of claim 9, wherein, when the first input capacitor has a voltage less than that of the second input capacitor, the control circuit brings forward in time transitions in the first and second switch control signals and delays transitions of the third and fourth switch control signals.

12. The power converter of claim 1, wherein (i) when the first and the fourth switching devices are both non-conducting, the voltage across the first and second electrical nodes goes to a first voltage level, (ii) when one of the first and the fourth switching devices is conducting, the voltage across the first and second electrical nodes goes to a second voltage level, and (iii) when the first and the fourth switching devices are both conducting, the voltage across the first and second electrical node goes to a third voltage level.

13. The power converter of claim 12, wherein the first voltage level is ground.

14. The power converter of claim 12, wherein the second voltage level is substantially one-half the input signal.

15. The power converter of claim 12, wherein the third voltage level is substantially the input signal.

16. The power converter of claim 1, wherein the control circuit is configurable to generate the first, second, third, and fourth switch control signals according to a second modulation scheme different from the first modulation scheme.

17. The power converter of claim 16, wherein the second modulation scheme operates as a symmetrical modulation scheme.

18. The power converter of claim 16, wherein one of the first and second modulation schemes comprises variable-frequency modulation.

19. The power converter of claim 16, wherein one of the first and second modulation schemes comprises constant-frequency modulation control.

20. The power converter of claim 16, wherein the control circuit varies a gain of the power converter by operating the power converter under the first modulation scheme for a first time period and operating the power converter under the second modulation scheme for a second time period.

21. The power converter of claim 1, wherein the secondary-side circuit comprises a full-bridge rectifier circuit.

22. The power converter of claim 21, wherein the full-bridge rectifier circuit comprises synchronous rectifiers.

23. The power converter of claim 21, wherein the full-bridge rectifier circuit comprises diodes.

24. The power converter of claim 1, wherein the secondary winding is center-tapped and wherein secondary-side circuit comprises first and second rectifiers connected in a half-bridge configuration.

25. The power converter of claim 24, wherein each of the first and second rectifiers comprises a synchronous rectifier.

26. The power converter of claim 24, wherein each of the first and second rectifiers comprises a diode.

27. The power converter of claim 1, wherein the voltage source comprises a controllable variable voltage source.

28. The power converter of claim 27, wherein the variable voltage source is controlled by either the control unit or by an external signal.

29. The power converter of claim 1, wherein the voltage source comprises first and second fixed voltage sources.

* * * * *